(12) United States Patent
Jones et al.

(10) Patent No.: US 8,217,533 B2
(45) Date of Patent: Jul. 10, 2012

(54) CONTROL METHODS FOR THE SYNCHRONIZATION AND PHASE SHIFT OF THE PULSE WIDTH MODULATION (PWM) STRATEGY OF POWER CONVERTERS

(75) Inventors: Rodney Jones, Stoke On Trent (GB); Robert Vernon Fulcher, Stoke on Trent (GB); Henrik Stiesdal, Odense C (DK)

(73) Assignee: Converteam Technology Ltd, Warwickshire (GB)

( * ) Notice: Subject to any disclaimer, the term of this patent is extended or adjusted under 35 U.S.C. 154(b) by 159 days.

(21) Appl. No.: 12/152,567

(22) Filed: May 15, 2008

(65) Prior Publication Data

US 2008/0284252 A1  Nov. 20, 2008

(30) Foreign Application Priority Data

May 19, 2007 (GB) .................................. 0709645.6

(51) Int. Cl.
*H02J 3/00* (2006.01)
(52) U.S. Cl. ................ 307/82; 363/34; 363/35; 363/36; 363/37; 363/65; 318/34
(58) Field of Classification Search .......................... None
See application file for complete search history.

(56) References Cited

U.S. PATENT DOCUMENTS

| | | | | |
|---|---|---|---|---|
| 4,174,534 A * | 11/1979 | Kotlarewsky | ................... | 363/26 |
| 5,450,309 A * | 9/1995 | Rohner | ........................... | 363/71 |
| 5,657,217 A * | 8/1997 | Watanabe et al. | ............... | 363/71 |
| 5,659,208 A * | 8/1997 | Kimble et al. | .................. | 307/82 |
| 5,682,303 A * | 10/1997 | Goad | .............................. | 363/71 |
| 5,852,554 A * | 12/1998 | Yamamoto | ...................... | 363/71 |
| 5,883,797 A * | 3/1999 | Amaro et al. | ................... | 363/65 |
| 5,933,339 A * | 8/1999 | Duba et al. | ..................... | 363/71 |
| 5,991,173 A * | 11/1999 | Nishikawa | ...................... | 363/37 |
| 6,075,717 A | 6/2000 | Kumar et al. | | |
| 6,101,109 A * | 8/2000 | Duba et al. | ..................... | 363/71 |
| 6,301,130 B1 * | 10/2001 | Aiello et al. | ..................... | 363/37 |
| 6,392,905 B1 | 5/2002 | Huang et al. | | |
| 7,425,806 B2 * | 9/2008 | Schnetzka et al. | ............... | 318/41 |
| 7,586,768 B2 * | 9/2009 | Yoshimoto | ...................... | 363/71 |
| 7,724,548 B2 * | 5/2010 | Jones et al. | ..................... | 363/37 |
| 2002/0145896 A1 | 10/2002 | Caruthers et al. | | |
| 2003/0142517 A1 * | 7/2003 | Furukawa et al. | ............... | 363/37 |
| 2005/0225270 A1 * | 10/2005 | Schnetzka et al. | ............... | 318/66 |
| 2007/0013325 A1 * | 1/2007 | Kiuchi et al. | ................... | 318/34 |
| 2008/0285314 A1 * | 11/2008 | Kojori | ............................. | 363/37 |

FOREIGN PATENT DOCUMENTS

WO    WO 2005/031939           4/2005
WO    WO 2005/031939 A1        4/2005

* cited by examiner

*Primary Examiner* — Rexford Barnie
*Assistant Examiner* — Justen Fauth
(74) *Attorney, Agent, or Firm* — Kirschstein, et al.

(57) ABSTRACT

A method of controlling a plurality of power converters 1a, 1b and 1c can be used to interface to a supply network, ac busbar etc. Each power converter includes a network bridge 14 operating in accordance with a pulse width modulation (PWM) strategy having the same switching period and which causes at least one unwanted harmonic in the supply network voltage. The method includes the step of providing the switching period of the PWM strategy of each network bridge with a different time offset relative to a time datum such that the at least one unwanted harmonic in the supply network voltage is at least partially cancelled. Two alternative ways of providing the time offset are described.

39 Claims, 9 Drawing Sheets

CONTROL METHODS FOR THE SYNCHRONIZATION AND PHASE SHIFT OF THE PULSE WIDTH MODULATION (PWM) STRATEGY OF POWER CONVERTERS

FIELD OF THE INVENTION

The present invention relates to methods for controlling the synchronization of power converters operating with a pulse width modulation (PWM) strategy and which can be used to interface generators providing variable voltage at variable frequency to a power grid or supply network at nominally fixed voltage and frequency. However, the methods can also be used for the synchronization of power converters operating with a PWM strategy that are used to interface a motor requiring variable voltage at variable frequency to a supply network (ac busbar) at nominally fixed voltage and frequency, for example. Further uses would include the synchronization of power converters operating with a PWM strategy that are configured to provide static volt-ampere reactive (VAR) compensation.

BACKGROUND OF THE INVENTION

With regard to the first of the potential uses mentioned above, it is possible to convert wind energy to electrical energy by using a wind turbine to drive the rotor of a generator, either directly or by means of a gearbox. The ac frequency that is developed at the stator terminals of the generator (the "stator voltage") is directly proportional to the speed of rotation of the rotor. The voltage at the generator terminals also varies as a function of speed and, depending on the particular type of generator, on the flux level. For optimum energy capture, the speed of rotation of the output shaft of the wind turbine will vary according to the speed of the wind driving the turbine blades. To limit the energy capture at high wind speeds, the speed of rotation of the output shaft is controlled by altering the pitch of the turbine blades. Connection of the variable voltage and frequency of the generator to the nominally fixed voltage and frequency of the supply network can be achieved by using a power converter.

The power converter typically includes a generator bridge, which in normal operation operates as an active rectifier to supply power to a dc link. The generator bridge can have any suitable topology with a series of semiconductor power switching devices fully controlled and regulated using a pulse width modulation (PWM) strategy.

The dc output voltage of the generator bridge is fed to the dc terminals of a network bridge, which in normal operation operates as an active inverter. The principal control for the dc output voltage is achieved by controlling the generator bridge but other methods of controlling the dc link voltage are possible. The network bridge can have any suitable topology with a series of semiconductor power switching devices fully controlled and regulated using a PWM strategy.

The ac output voltage of the network bridge is filtered and supplied to the nominally fixed frequency supply network via a step-up transformer. Protective switchgear can be included to provide a reliable connection to the supply network and to isolate the generator and converter system from the supply network for various operational and non-operational requirements.

The power that is exported to the supply network must meet the requirements defined in the various standards and grid codes. For example, in one of the relevant standards, the amplitude of the harmonic voltage distortion relating to the sidebands of the switching frequency should be kept below 0.2% of the voltage amplitude of the voltage waveform of the supply network at the fundamental frequency.

The PWM strategy used in the network bridge will typically operate at a given switching frequency. The mixing between the nominally fixed frequency of the power grid or supply network and the switching frequency of the PWM strategy will cause harmonics in the ac output voltage of the network bridge. If two or more power converters are connected to a common supply network or power grid (for example, in the case of a wind turbine farm where a plurality of wind turbines might be connected to a supply network through a parallel connection) then the overall harmonic voltage distortion in the power that is exported to the supply network may exceed the required limits defined for the common point.

SUMMARY OF THE INVENTION

The present invention provides a method of controlling a plurality of power converters that can be used to interface to a supply network, each power converter comprising a network bridge operating in accordance with a pulse width modulation (PWM) strategy having the same switching period and which causes at least one unwanted harmonic in the supply network voltage, the method comprising the step of providing the switching period of the PWM strategy of each network bridge with a different time offset relative to a time datum such that the at least one unwanted harmonic in the supply network voltage is at least partially cancelled.

An advantage of such a method is that at least one unwanted harmonic (for example, an unwanted harmonic generated by the mixing of the nominally fixed frequency of the power grid or supply network and the switching frequency of the PWM strategy) can be at least partially, and in some cases, completely, cancelled. In a case where each power converter is used to interface a generator to the supply network then this method enables the power exported to the supply network by an array of network bridges to meet the requirements on harmonic distortion defined in the various standards and grid codes. In a case where each power converter is used to interface a motor to the supply network (or busbar) then this method enables any harmonic distortion in the supply network voltage that arises from the operation of each network bridge to be reduced. Similarly, in a case where each power converter is operating as a static volt-ampere reactive (VAR) compensator then this method enables any harmonic distortion in the supply network voltage that arises from the operation of each network bridge to be reduced.

The operation of each power converter, and in particular the PWM strategy applied to the associated network bridge, may be controlled by an electronic controller. The controller may be integrated with the network bridge or provided as a separate stand-alone unit. In any event, it will be appreciated that the controller forms a component part of the more general power converter and any reference in this description to the controller or the network bridge can be assumed to be a reference to its associated power converter or vice versa. More particularly, any reference in this description to a control operation being provided by the power converter may also be performed by the controller or network bridge where appropriate.

It will be readily appreciated from the description below that the "time datum" against which all of the various time offsets are compared may be taken to be an edge (e.g. a rising or falling edge) of a pulse of a common time signal or a time signal generated by a "master" power converter in a cascaded-array arrangement, for example. Any suitable "time datum"

may be used depending on the circumstances and the intended operating conditions of the power converters.

In a first embodiment of the present invention the method may further comprise the steps of generating a common time signal to act as the time datum, providing the common time signal to each power converter, and providing the switching period of the PWM strategy of each network bridge with a different time offset relative to the common time signal such that the at least one unwanted harmonic in the supply network voltage is at least partially cancelled.

The switching periods of the PWM strategy for each network bridge are all nominally the same and are synchronized (or "locked") to the common time signal with their respective time offset.

In the case where the method is used to control three parallel-connected power converters, the network bridge of the first power converter may be operated in accordance with a PWM strategy having a given switching period that is offset by a first time period relative to the common time signal. The network bridge of the second power converter may be operated in accordance with a PWM strategy having the same given switching period that is offset by a second time period relative to the common time signal. The network bridge of the third power converter may be operated in accordance with a PWM strategy having the same given switching period that is offset by a third time period relative to the common time signal. The first, second and third time offsets are all different and are selected such that the at least one unwanted harmonic in the supply network voltage is at least partially cancelled.

The time period by which the switching period of the PWM strategy of one of the network bridges is offset relative to the common time signal can be zero.

The time offset by which the PWM strategy of each network bridge is shifted relative to the common time signal may be expressed in terms of a percentage of the switching period of the PWM strategy. For example, in the above case where the method is used to control three parallel-connected power converters, the network bridge of the first power converter may be operated in accordance with a PWM strategy having a given switching period that is offset by a first time period of 0% of the switching period (i.e., the switching period of the PWM strategy of the network bridge of the first power converter has no time offset relative to the common time signal). The network bridge of the second power converter may be operated in accordance with a PWM strategy having the same given switching period that is offset by a second time period of 33.3% of the switching period. The network bridge of the third power converter may be operated in accordance with a PWM strategy having the same given switching period that is offset by a third time period of 66.6% of the switching period.

The PWM strategy can be represented by a carrier waveform having a nominal PWM frequency. Each time offset can therefore be considered to be equivalent to a phase shift of the carrier waveform of the PWM strategy of each network bridge. If the PWM period is equivalent to 360° and the first, second and third time periods are 0%, 33.3% and 66.6% of the switching period then the carrier waveform of the PWM strategy of each network bridge will be phase shifted by 0°, 120° and 240°, respectively.

The same principle can, of course, be applied to an arrangement with any number of parallel-connected power converters.

The time offset of the PWM strategy of each network bridge may be determined with reference to the number of power converters that are being controlled by the method of the present invention. The time offset associated with one or more of the network bridges may therefore be adjusted if the number of power converters that are connected to the supply network changes. This adjustment makes sure that the at least one unwanted harmonic in the supply network voltage is cancelled effectively even when one or more of the power converters go off-line or come back on-line. If a particular time offset does have to be adjusted then this is preferably carried out gradually (using a ramp function, for example) rather than in a sudden and discrete manner.

Each power converter may transmit status information to say if it is on-line (i.e., connected to the supply network and operating properly) or off-line. Connection information about the number of power converters that are connected to the supply network at any given time can be transmitted to all of the power converters, either periodically or when the number of on-line power converters changes. The timing requirements for the status and connection information is not usually as stringent as for the common time signal since the at least one unwanted harmonic may be allowed to exceed the levels for harmonic voltage distortion defined in the various standards and grid codes for a relatively short period of time. The status information and connection information can be transmitted as a wireless signal such as a radio frequency (RF) signal, for example, or an electrical or optical signal transmitted through an electrical cable or an optical fiber.

The common time signal may be generated by a stand-alone timing controller and then transmitted to all of the power converters. Alternatively, the common time signal may be generated by one of the power converters and then transmitted to all of the remaining power converters. The power converter that generates the common time signal would normally be referred to as the "master" power converter and the remaining power converters would normally be referred to as "slave" power converters. The switching period of the PWM strategy of the network bridge of the "master" power converter must have its phase locked to the common time signal and be provided with a suitable time offset relative to the common time signal as described above. The common time signal may be generated by a timing controller integrated with the "master" power converter.

The common time signal may have a fixed period. For example, the common time signal may be derived from a Global Navigation Satellite System (GNSS) such as the 1 second tick provided by the Global Positioning System (GPS). If the network bridge of each power converter has a nominal switching frequency of 2.5 kHz then this will be equivalent to 2500 executions of the PWM strategy per 1 second tick. The period of the common time signal may also be equal to the nominal switching period of the PWM strategy. If the network bridge of each power converter has a nominal switching period of 400 μs then the common time signal may be a 400 μs tick with 1 period of the PWM strategy being executed per tick.

In the case where the supply network is a power grid then the period of the common time signal may be related to, or derived from, the nominally fixed frequency of the supply network. If the frequency varies between upper and lower limits as a result of power imbalances within the overall network (if load power is in excess of generated power then the frequency will fall and vice versa) then the common time signal may be adjusted to track those frequency changes. British Patent Application 0617371.0 to the present Applicant (the contents of which are herein incorporated by reference) describes a method of controlling a power converter that can be used to interface to a supply network operating at a time-varying frequency. The power converter comprises a network bridge operating in accordance with a PWM strategy having a switching frequency, a nominal switching frequency and a number of pulses per period. The switching frequency of the PWM strategy is varied in accordance with the time-varying frequency of the supply network to preferably achieve only integer harmonics (and preferably only integer odd harmonics) of the time-varying frequency. The common time signal used in the present method may therefore be set to be a tick having a period that is equal to the reciprocal of the switching frequency (Fpwm) of the PWM strategy derived from the method of British Patent Application 0617371.0 with 1 period of the PWM strategy being executed per tick.

The switching period of the PWM strategy that is applied to each network bridge is then preferably set to be equal to the period of the common time signal. This method provides a way of setting the switching period of the PWM strategy of each power converter remotely using the common time signal to achieve additional benefits.

The common time signal may be transmitted from the stand-alone timing controller to the power converters or from the "master" power converter to the "slave" power converters by any suitable means. For example, the common time signal may be a wireless signal such as a radio frequency (RF) signal, for example, or an electrical or optical signal transmitted through an electrical cable or an optical fiber. It may be necessary to compensate for hardware delays caused primarily by the transmission time of the common time signal to the power converters. This is particularly true if delay is a significant proportion of the switching period of the PWM strategy. The compensation may involve the use of a further time offset to the switching period of the PWM strategy of the network bridges of one or more of the power converters. More particularly, the switching period of the PWM strategy may have a first time offset relative to the common time signal to provide the principal means for cancellation of harmonic voltage distortion and a second time offset relative to the common time signal to compensate for delays in the transmission time of the common time signal and PWM frequency transmission delays in the network supply cables to further optimize the cancellation achieved.

In a second embodiment of the present invention the method comprises the steps of determining the number of power converters connected to the supply network, determining the switching period of the PWM strategy of the network bridge of a first power converter, transmitting a time signal having a pulse period equal to the switching period of the PWM strategy of the network bridge of the first power converter to a second power converter to act as the time datum, measuring the pulse period of the time signal, setting the switching period of the PWM strategy of the network bridge of the second power converter to be same as the measured pulse period of the time signal, and offsetting the switching period of the PWM strategy of the network bridge of the second power converter relative to the time signal by a time period that is substantially equal to the measured pulse period of the time signal divided by the number of power converters connected to the supply network such that the at least one unwanted harmonic in the supply network voltage is at least partially cancelled.

For example, in the most basic case where two power converters are determined to be connected to the supply network, the switching period of the PWM strategy of the network bridge of the second power converter will be offset by a time period that is substantially equal to the measured pulse period of the first time signal divided by two.

Any number of power converters may be connected together as described above to define a cascaded array. It will be readily appreciated that the term "cascaded" refers to the way in which the time signals are passed between the power converters in the array and that each power converter in the array is still connected in parallel to the supply network. Each power converter will preferably transmit a time signal having a pulse period equal to the switching period of the PWM strategy of its associated network bridge. Each power converter that receives a time signal will preferably measure the pulse period of the received time signal, set the switching period of the PWM strategy of its network bridge to match the measured pulse period and offset the switching period of the PWM strategy of its associated network bridge by a time period that is substantially equal to the measured pulse period of the received time signal divided by the number of power converters connected to the supply network.

For a cascaded array of N power converters, the method may further comprise the steps of transmitting an Nth time signal having a pulse period equal to the switching period of the PWM strategy of the network bridge of the Nth power converter to the first power converter. In other words, the first power converter in the array preferably receives a time signal from the last power converter in the array. The array can therefore be a "closed loop" array.

The number of power converters N that are connected to the supply network may be determined by the number of power converters that are physically connected to the supply network irrespective of their operating status. In this case, N will be essentially fixed and based on the construction arrangement of a particular wind farm, marine propulsion application or volt-ampere reactive (VAR) compensator, for example. For cancellation purposes, the number of power converters N that are connected to the supply network will not alter if one or more of the power converters goes off-line for any reason. This can lead to less effective cancellation of the at least one unwanted harmonic in the supply network voltage but may be more suitable for certain applications.

It will generally be preferred that the number of power converters N that are connected to the supply network is determined by the number of power converters that are physically connected to the supply network and on-line at any given time. In other words, N is dynamic and changes in response to the operating status of the power converters in the array. This means that the number of power converters N that are connected to the supply network will be updated to provide more effective cancellation of the at least one unwanted harmonic in the supply network voltage and each power converter may transmit status information to say if it is on-line or off-line. Connection information about the number of power converters N that are connected to the supply network at any given time can be transmitted to all of the power converters, either periodically or when the number of on-line power converters changes. Each power converter preferably uses the most up to date or current value of N when determining the offset to be applied to the switching period of the PWM strategy of its associated network bridge.

The time signals may be transmitted from one power converter to another by any suitable means. For example, time signals may be a wireless signal such as a radio frequency (RF) signal, for example, or an electrical or optical signal transmitted through an electrical cable or an optical fiber.

The power converter in the array that is the first to come on-line preferably assumes a role as a "master" power converter and takes a position as the first power converter in the array. In the first instance, the decision to assume the role as the "master" power converter is made because of the absence or lack of any time signal being received by that power converter. Any power converter that receives a time signal when it comes on-line will preferably assume a role as a "slave" power converter. Any "slave" power converter that fails to receive a time signal for any reason (i.e., the immediately preceding power converter in the array goes off-line or the time signal is disrupted) may assume a role as a "master" power converter.

An array may start out by having two or more "master" power converters depending on the order in which the power converters come on-line. An array may also end up having two or more "master" power converters if one or more power converter goes off-line. In this case the array is effectively divided into a series of sub-arrays with each "master" power converter adopting a position as the first power converter within its associated sub-array. When all of the power converters in the array are on-line and operating properly then there will preferably only be one "master" power converter. This "master" power converter will preferably take a position as the first power converter in the array and the remaining power converters will preferably assume a role as a "slave" power converter and take an appropriate position in the array.

The time signals transmitted between adjacent power converters in the array may contain information about the role (i.e., "master" or "slave") and/or the position of the power converter that transmits the time signal has in the array. Although the time signals will usually have the same pulse period they may have different pulse widths that are indicative of the position of the power converter in the array. This can be useful in the event that one of the power converters in the array goes off-line or develops a fault. When all of the power converters in the array are on-line and operating properly then the pulse width of the Nth time signal that is received by the first power converter in the array can be used to confirm its role as the only "master" power converter in the array. Any power converter that assumes a role as a "master" power converter but receives a time signal having a pulse width that is different from the one that would normally confirm the "master" role can be made to assume a role as a "slave" power converter and take an appropriate position in the array.

For example, in a cascaded array of three power converters where the first power converter in the array receives a time signal from the last power converter in the array then each power converter may be configured to:

(a) determine a pulse period for a PWM strategy (using a suitable method such as described in more detail below) and if it is a "master" power converter (i) take a position as the first power converter in the array, (ii) apply a PWM strategy having the determined pulse period to its associated network bridge, and (iii) transmit a time signal having a pulse period equal to the determined pulse period and a pulse width of 20 μs; and (b) if it is a "slave" power converter (i) measure the pulse period of the received time signal, (ii) apply a PWM strategy having the measured pulse period to its associated network bridge, and (iii) transmit a time signal having a pulse width equal to the pulse width of the received time signal plus 20 μs.

This means that the first "slave" power converter that receives a time signal from the "master" power converter will transmit a time signal with a pulse width of 40 μs and the second "slave" power converter that receives a time signal from the first "slave" power converter will transmit a time signal with a pulse width of 60 μs. It will be readily appreciated that other pulse widths are possible.

Each power converter may also be configured to remain a "master" power converter if it receives no time signal or a time signal having a pulse width of 60 μs, but to switch from its role as a "master" power converter to a "slave" power converter if it receives a time signal having a pulse width of 20 μs or 40 μs.

If the three cascaded power converters are conveniently labelled as A, B and C and transmit time signals in the sequence A→B, B→C and C→A then the following examples may be used to explain how they would operate in different circumstances. The time signals may be considered as a series of digital time pulses having states 0 and 1 such that the pulse period is defined as the time between rising or falling edges of successive time pulses and the pulse width is defined as the period of time during which state 1 applies. In the following examples, it is assumed that N=3 at all times.

1. Power converter A is the first to come on-line and takes a role as a "master" power converter and the first position in the array. It outputs a time signal having a pulse width of 20 μs and a pulse period equal to the switching period of the PWM strategy of its network bridge (which switching period can be based on a local determination or transmitted from a stand-alone controller, for example). A falling edge of the time signal output by power converter A is aligned with the start of the switching period of the PWM strategy of its network bridge. Power converter B is the next to come on-line. It receives a time signal from power converter A having a pulse width of 20 μs. It takes a role as a "slave" power converter because it is receiving a time signal and the second position in the array. It measures the pulse period of the received time signal, sets the switching period of the PWM strategy of its network bridge to match the measured pulse period and applies a time offset that is equal to the measured pulse period divided by three. This time offset is used to determine the start of the switching period of the PWM strategy of the network bridge of power converter B. Power converter B outputs a time signal having a pulse width equal to the pulse width of the received time signal plus 20 μs (i.e., a pulse width of 40 μs) and a pulse period equal to the switching period of the PWM strategy of its network bridge. A falling edge of the time signal output by power converter B is aligned with the start of the switching period of the PWM strategy of its network bridge. Power converter C is the last to come on-line. It receives a time signal from power converter B having a pulse width of 40 μs. It takes a role as a "slave" power converter because it is receiving a time signal and the third position in the array. It measures the pulse period of the received time signal, sets the switching period of the PWM strategy of its network bridge to match the measured pulse period and applies a time offset that is equal to the measured pulse period divided by three. This time offset is used to determine the start of the switching period of the PWM strategy of its network bridge. Power converter C outputs a time signal having a pulse width equal to the pulse width of the received time signal plus 20 μs (i.e., a pulse width of 60 μs) and a pulse period equal to the switching period of the PWM strategy of its network bridge. A falling edge of the time signal output by power converter C is aligned with the start of the switching period of the PWM strategy of its network bridge. Power converter A receives a time signal from power converter C having a pulse width of 60 μs that confirms its role as a "master" power converter and its operation remains unchanged.

2. The array functions normally until power converter A goes off-line or its time signal is disrupted. Power converter B no longer receives a time signal and takes a role as a "master" power converter and the first position in the array. It uses a local determination of the switching period of the PWM strategy of its network bridge and outputs a time signal having a pulse width of 20 μs and a pulse period equal to the switching period of the PWM strategy of its network bridge. A falling edge of the time signal output by power converter B is aligned with the start of the switching period of the PWM strategy of its network bridge. Power converter C receives a time signal from power converter B having a pulse width of 20 µs. It retains its existing role as a "slave" power converter because it is receiving a time signal and but takes the second position in the array. It measures the pulse period of the received time signal, sets the switching period of the PWM strategy of its network bridge to match the measured pulse period and applies a time offset that is equal to the measured pulse period divided by three. This time offset is used to determine the start of the switching period of the PWM strategy of the network bridge of power converter C. Power converter C outputs a time signal having a pulse width equal to the pulse width of the received time signal plus 20 µs (i.e., a pulse width of 40 µs) and a pulse period equal to the switching period of the PWM strategy of its network bridge. A falling edge of the time signal output by power converter C is aligned with the start of the switching period of the PWM strategy of its network bridge. When power converter A comes back on-line it receives a time signal from power converter C having a pulse width of 40 µs. It takes a role as a "slave" power converter because it is receiving a time signal and the third position in the array. It measures the pulse period of the received time signal, sets the switching period of the PWM strategy of its network bridge to match the measured pulse period and applies a time offset that is equal to the measured pulse period divided by three. This time offset is used to determine the start of the switching period of the PWM strategy of its network bridge. Power converter A outputs a time signal having a pulse width equal to the pulse width of the received time signal plus 20 µs (i.e., a pulse width of 60 µs) and a pulse period equal to the switching period of the PWM strategy of its network bridge. A falling edge of the time signal output by power converter A is aligned with the start of the switching period of the PWM strategy of its network bridge. Power converter B receives a time signal from power converter A having a pulse width of 60 µs that confirms its role as a "master" power converter and its operation remains unchanged.

3. Power converter A is the first to come on-line and takes a role as a "master" power converter and the first position in the array. It outputs a time signal having a pulse width of 20 µs and a pulse period equal to the switching period of the PWM strategy of its network bridge (which switching period can be based on a local determination or transmitted from a stand-alone controller, for example). A falling edge of the time signal output by power converter A is aligned with the start of the switching period of the PWM strategy of its network bridge. Power converter C is the next to come on-line and also takes a role as a "master" power converter and the first position in the array. It uses a local determination of the switching period of the PWM strategy of its network bridge and outputs a time signal having a pulse width of 20 µs and a pulse period equal to the switching period of the PWM strategy of its network bridge. A falling edge of the time signal output by power converter C is aligned with the start of the switching period of the PWM strategy of its network bridge. Power converter A now receives a time signal from power converter C having a pulse width of 20 µs. It therefore switches from its role as a "master" power converter to a "slave" power converter and takes the second position in the array. It measures the pulse period of the received time signal, sets the switching period of the PWM strategy of its network bridge to match the measured pulse period and applies a time offset that is equal to the measured pulse period divided by three. This time offset is used to determine the start of the switching period of the PWM strategy of the network bridge of power converter A. Power converter A outputs a time signal having a pulse width equal to the pulse width of the received time signal plus 20 µs (i.e., a pulse width of 40 µs) and a pulse period equal to the switching period of the PWM strategy of its network bridge. A falling edge of the time signal output by power converter A is aligned with the start of the switching period of the PWM strategy of its network bridge. When power converter B comes on-line it receives a time signal from power converter A having a pulse width of 40 µs. It takes a role as a "slave" power converter because it is receiving a time signal and the third position in the array. It measures the pulse period of the received time signal, sets the switching period of the PWM strategy of its network bridge to match the measured pulse period and applies a time offset that is equal to the measured pulse period divided by three. This time offset is used to determine the start of the switching period of the PWM strategy of its network bridge. Power converter B outputs a time signal having a pulse width equal to the pulse width of the received time signal plus 20 µs (i.e., a pulse width of 60 µs) and a pulse period equal to the switching period of the PWM strategy of its network bridge. A falling edge of the time signal output by power converter B is aligned with the start of the switching period of the PWM strategy of its network bridge. Power converter C receives a time signal from power converter B having a pulse width of 60 µs that confirms its role as a "master" power converter and its operation remains unchanged.

The power converters in the array can therefore come on-line in a random order and can automatically cope with situations where a power converter goes off-line. It will be readily appreciated that although in the above examples N=3 at all times, it would be possible for N to vary as the power converters go off-line and come back on-line. For example, in a situation where power converter A is off-line (i.e., where N=2) then the power converters B and C would apply a time offset that is equal to the respective measured pulse period divided by two.

The switching period of the PWM strategy of the network bridge of a "master" power converter (and hence the pulse period of the time signals) may be fixed. For example, the pulse period may be 400 µs if the nominal switching frequency of the network bridge is 2.5 kHz. All the power converters in the array may therefore make an independent determination of the switching period of the PWM strategy to be applied to its network bridge in the event that they assume a role as a "master" power converter. When a power converter assumes a role as a "slave" power converter then the switching period of the PWM strategy to be applied to its network bridge is determined by measuring the pulse period of the received time pulse. The switching period of the PWM strategy for all of the power converters in an array (or sub-array) is therefore preferably determined solely by the relevant "master" power converter.

In other words, although some control operations will preferably be carried out by all of the power converters independently so that they can all be configured with identical firmware, it may be the case that these control operations are effectively suppressed when a power converter assumes a role as a "slave" power converter. For example, in the case where the supply network is a power grid, each power converter may make an independent determination of the switching period of the PWM strategy using the method of British Patent Application 0617371.0 as described above. However, only the "master" power converter will use this determination when it sets the switching period of the PWM strategy to be applied to its network bridge and transmitted to the "slave" power converters through the time signals. Each "slave" power converter will ignore its own independent determination and set the switching period of the PWM strategy to be applied to its associated network bridge from the measured pulse period of the received time signal.

The present invention further provides a plurality of power converters that can be used to interface to a supply network, each power converter comprising a network bridge operating in accordance with a pulse width modulation (PWM) strategy having the same switching period and which causes at least one unwanted harmonic in the supply network voltage and a controller, wherein the controllers are arranged to provide the switching period of the PWM strategy of each network bridge with a different time offset relative to a time datum such that the at least one unwanted harmonic in the supply network voltage is at least partially cancelled.

In a first embodiment of the present invention a common time signal may be provided to each power converter to act as the time datum and the controllers are adapted to provide the switching period of the PWM strategy of each network bridge with a different time offset relative to the common time signal such that the at least one unwanted harmonic in the supply network voltage is at least partially cancelled.

In a second embodiment of the present invention a time signal having a pulse period equal to a switching period of the PWM strategy of the network bridge of a first power converter may be transmitted to a second power converter to act as the time datum. The controller of the second power converter may be adapted to measure the pulse period of the time signal, set the switching period of the PWM strategy of the network bridge of the second power converter to be same as the measured pulse period of the time signal, and offset the switching period of the PWM strategy of the network bridge of the second power converter relative to the time signal by a time period that is substantially equal to the measured pulse period of the time signal divided by the number of power converters connected to the supply network such that the at least one unwanted harmonic in the supply network voltage is at least partially cancelled.

The power converters can be used for both motoring and generating applications. For example, the power converters can be used to interface a generator to a supply network or power grid. In this case the network bridge will normally be operating as an active inverter. The power converter can also be used to interface a motor to a supply network (ac busbar). In this case the network bridge will normally be operating as an active rectifier. Each power converter can operate as a static volt-ampere reactive (VAR) compensator.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Common Time Signal

Figure 1:
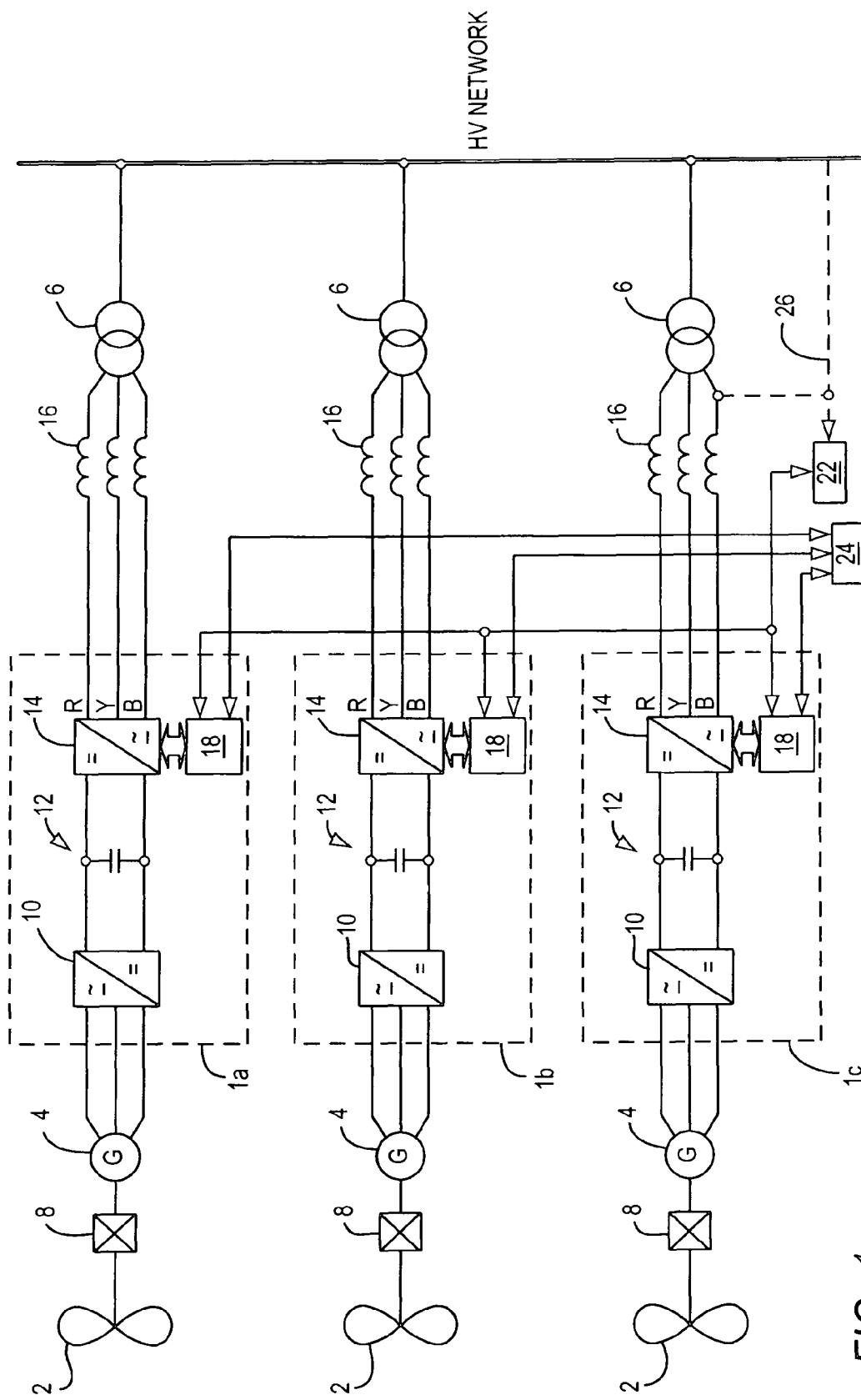
FIG. 1 is a schematic drawing showing how a plurality of power converters according to the present invention can be used to interface between wind turbines driving a variable speed generator and a power network.

The basic topology of a power converter arrangement for wind turbine applications using a common time signal will be outlined with reference to FIG. 1.

In the basic topology of FIG. 1 three parallel-connected power converters 1a, 1b and 1c are used to interface between wind turbines 2 each driving a variable speed ac induction generator 4 and a shared supply network (labelled HV NETWORK). Each wind turbine typically includes three turbine blades (although other numbers of turbine blade are also possible) mounted on a rotating shaft and whose pitch can be controlled by means of a pitch actuator in order to optimise and/or limit the capture of wind energy into the generator 4. A gearbox 8 is used to connect the rotating shaft to the rotor of each variable speed generator 4. In some cases, the rotating shaft can be connected directly to the rotor of the variable speed generator.

It will be readily appreciated that the induction generator 4 could be substituted by other types of generator including, for example, a permanent magnet generator. The combination of an induction generator 4 and a gearbox 8 could be substituted by a direct drive permanent magnet generator.

The ac terminals of each generator 4 are connected to the ac terminals of a three-phase generator bridge 10 which in normal operation operates as an active rectifier to supply power to a dc link 12. Each generator bridge 10 has a conventional three-phase two-level topology with a series of semiconductor power switching devices fully controlled and regulated using a PWM strategy. However, in practice the generator bridges 10 can have any suitable topology such a three-level neutral point clamped topology or a multi-level topology (Foch-Maynard arrangement, for example).

The dc output voltage of each generator bridge 10 is fed to the dc terminals of a network bridge 14 which in normal operation operates as an inverter. The network bridges 14 have a similar three-phase two-level topology to the generator bridges 10 with a series of semiconductor power switching devices fully controlled and regulated using a PWM strategy. However, in practice the network bridges 14 can have any suitable topology, as discussed above for the generator bridges 10. A suitable network bridge 14 would be the ALSPA MV3000 inverter available from Converteam Ltd of Boughton Road, Rugby, Warwickshire, CV21 1BU, United Kingdom.

The ac output voltage of each network bridge 14 contains voltage components at the fundamental frequency and the various unwanted harmonics relating to the beat frequency between the fundamental frequency and the nominal switching frequency of the PWM strategy. The ac output voltage of each network bridge 14 is filtered by a filter 16. The filtered ac output voltage of each network bridge 14 is then supplied to the supply network via a step-up transformer 6. Protective switchgear (not shown) can be included to provide a reliable connection to the supply network and to isolate the generator and converter systems from the supply network for various operational and non-operational requirements. Shunt filters (not shown) can also be used between the respective filters 16 and the step-up transformers 6. Such shunt filters could be simple capacitive filters or tuned filters designed to attenuate specific switching frequency harmonics.

Each power converter includes a controller 18 (which in practice can be incorporated as part of the network bridge 14) that controls the PWM strategy of the network bridge and receives a common time signal through an electrical cable from a stand-alone timing controller 22. The common time signal consists of, as a minimum, a single pulse at a known pulse interval. For the purposes of the following description, a single pulse having a minimum mark of 50 ms and a maximum mark of 950 ms with a period of 1 second and known accuracy is provided to each controller 18, where "mark" refers to the part of the common time signal where it is in the logic 1 state, for example. The nominal switching frequency of the PWM strategy used in each network bridge 14 is 2.5 kHz so that each network bridge operates with the same nominal switching period of 400 µs.

The actual switching frequency of the PWM strategy used by each network bridge 14 can also be varied in accordance with the time-varying frequency of the supply network to achieve only integer harmonics (and preferably only integer odd harmonics) of the time-varying frequency. In this case, the common time signal provided to each controller 18 may be a single pulse having a period that is equal to the reciprocal of the switching frequency (Fpwm) of the PWM strategy that is derived in accordance with the method of British Patent Application 0617371.0 to the present Applicant (the contents of which are herein incorporated by reference) with one period of the PWM strategy being executed per pulse. This is described in more detail below.

The switching period of the PWM strategy for each network bridge 14 will often be referenced to the rising edge of the pulse of the common time signal. However, the switching period of the PWM strategy for each network bridge 14 can be referenced to a particular time offset from the common time signal such that the switching period of the PWM strategy starts a set time after the rising edge of the common time signal. In both cases, the rising edge of each pulse of the common time signal will be acting as a time datum.

Figure 2:
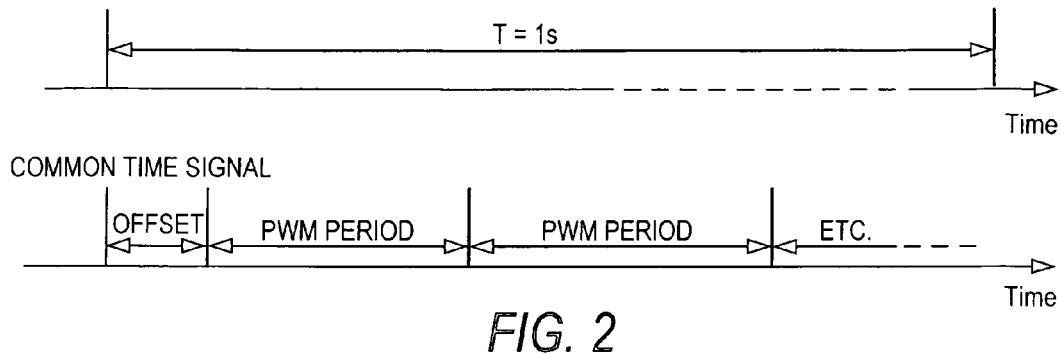
FIG. 2 is a schematic drawing showing the common time signal that is provided to each power converters of FIG. 1 and the pulse width modulation (PWM) strategy of the network bridge of each power converter of FIG. 1.

The common time signal provided to each controller 18 is illustrated schematically in FIG. 2 together with a representation of a PWM strategy for a network bridge 14. For reasons of clarity, it will be readily appreciated that the vertical markers in FIG. 2 represent the beginning and end of an envelope containing the individual pulses in one PWM cycle. The PWM strategy can be implemented using any suitable technique.

For a common time signal having a fixed period, the minimum information required by a given controller 18 to carry out the appropriate control of the PWM strategy of its associated network bridge 14 is the nominal duration of one period of the common time signal, the nominal switching frequency of the PWM strategy and the time offset relative to the common time signal that is to be applied to the PWM strategy. For the basic topology of FIG. 1 with three parallel-connected power converters 1a, 1b and 1c then the network bridge 14 associated with the first power converter 1a can be operated with a time offset of 0% of the switching period of the PWM strategy. The network bridge 14 associated with the second power converter 1b can be operated with a time offset of 33.3% of the switching period of the PWM strategy. The network bridge 14 associated with the third power converter 1c can be operated with a time offset of 66.6% of the switching period of the PWM strategy. For the situation where the nominal switching period of the PWM strategy is 400 µs then this means a time offset for the second and third power converters 1b and 1c of 133 µs and 266 µs respectively. (Such time offsets of 133 µs and 266 µs being a rounded integer result of 33.3% and 66.6% of the nominal period 400 µs of the PWM strategy. Where the remainders need to be taken into account then these are considered in the specific implementation of the invention.)

If 360° is equivalent to the nominal switching period of 400 µs then the time offsets represent phase shifts for the first, second and third power converters of 0°, 120° and 240° respectively.

Figure 3:
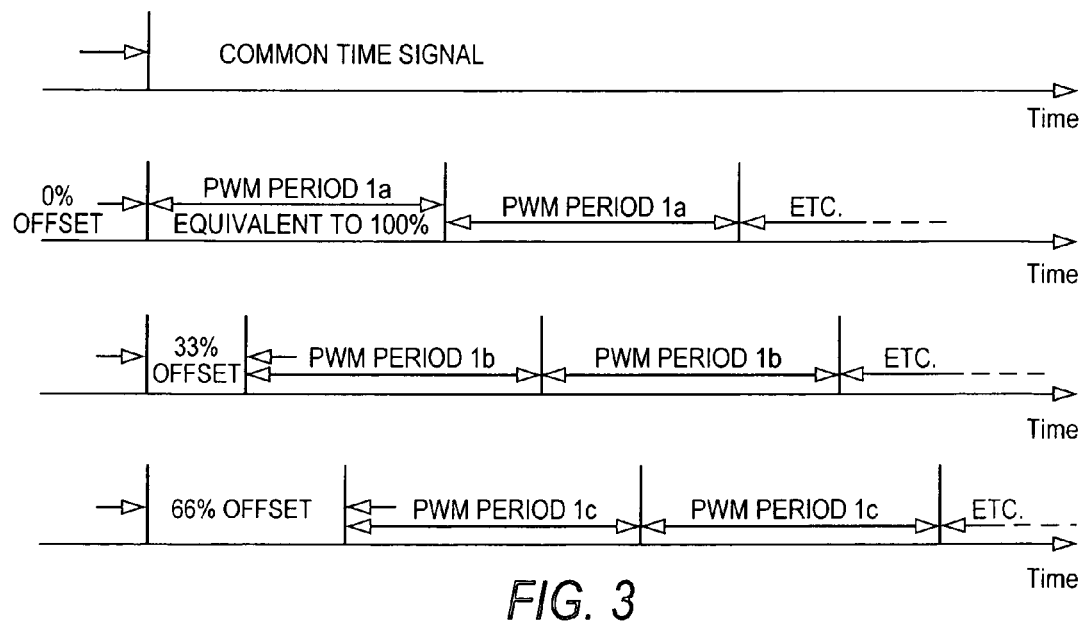
FIG. 3 is a schematic drawing showing how the PWM strategy of the network bridge of each power converter of FIG. 1 is offset relative to the common time signal of FIG. 2.

FIG. 3 shows how the PWM strategies of the three network bridges 14 are operated with a time offset relative to a common time signal acting as the time datum. More particularly, it can seen from FIG. 3 that the PWM strategy for the network bridge 14 of the first power converter 1a is timed to start as closely as possible to each pulse of the common time signal (i.e., it has a time offset of 0% of the switching period of the PWM strategy). The PWM strategy for the network bridge 14 of the second power converter 1b is timed to start 133 µs after each pulse of the common time signal (i.e., it has a time offset of 33.3% of the switching period of the PWM strategy). Finally, the PWM strategy for the network bridge 14 of the third power converter 1c is timed to start 266 µs after each pulse of the common time signal (i.e., it has a time offset of 66.6% of the switching period of the PWM strategy).

It will be readily appreciated that similar time offsets can be determined for any number of parallel-connected power converters.

The stand-alone timing controller 22 can be omitted if the common time signal is generated by one of the controllers 18. This so-called "master" controller 18 (i.e., the controller associated with the "master" power converter) generates the common time signal and transmits it to the other "slave" controllers. For example, in the basic topology of FIG. 1 with three parallel-connected power converters 1a, 1b and 1c then "master" controller 18 of the first power converter 1a can provide a common time signal to the "slave" controllers of the second and third power converters 1b and 1c. For operational flexibility, for example in the case of the controller 18 of the first power converter 1a being taken off-line for servicing or during a fault, it can be useful if the role of "master" controller can also be achieved by the controllers of the second and third power converters 1b and 1c. The configuration can then be changed dynamically to deal with this situation and normal operation (including effective harmonic cancellation) can continue with the remaining power converters that are still on-line.

In order to provide the best possible cancellation of unwanted harmonic distortion in the supply network, the time offset applied to the PWM strategy of each network bridge 14 is preferably determined with reference to the number of power converters that are on-line and connected to the supply network at any given time. Each controller 18 therefore transmits status information to say if the associated power converter is on-line (i.e., connected to the supply network and operating properly) or off-line for any reason. Connection information about the number of power converters that are connected to the supply network at any given time is transmitted to all of the controllers 18, either periodically or when the number of power converters that are on-line changes. A stand-alone controller 24 receives the status information from each of the controllers 18 and transmits connection information to each of the controllers as shown in FIG. 1. Although not shown, the power converters 1a, 1b and 1c could be configured such that the status information and connection information is received and transmitted by one of the controllers 18 such as the "master" controller, for example. The connection information is used by each of the controllers 18 to determine the appropriate time offset to apply to the PWM strategy of its associated network bridge 14 according to:

$$\text{Time\_Offset} = (p-1) * (100\%/N)$$

where p is a given number of the controller (i.e., 1 for the controller of the first power converter 1a, 2 for the controller of the second power converter 1b, 3 for the controller of the third power converter 1c etc.); and N is the number of power converters that are connected to the supply network at any given time as provided by the connection information.

For example, if the number of power converters that are connected to the supply network was to increase from three to four as a result of a power converter that was not previously connected to the supply network coming on-line then the time offsets will be adjusted accordingly. For example, the PWM strategy for the network bridge 14 of the first power converter 1a will continue to be timed to start as closely as possible with each pulse of the common time signal (i.e., it has a time offset of 0% of the switching period of the PWM strategy). The PWM strategy for the network bridge 14 of the second power converter 1b will be timed to start 100 μs after each pulse of the common time signal (i.e., it has a time offset of 25% of the switching period of the PWM strategy). The PWM strategy for the network bridge 14 of the third power converter 1c will be timed to start 200 μs after each pulse of the common time signal (i.e., it has a time offset of 50% of the switching period of the PWM strategy). Finally, the PWM for the network bridge 14 of the fourth power converter (not shown) will be timed to start 300 μs after each pulse of the common time signal (i.e., it has a time offset of 75% of the switching period of the PWM strategy). The adjustment in the respective time offsets is preferably carried out in gradual manner so that the normal PWM strategy of each network bridge is not unduly disturbed at the time of changing the configuration. For example, the time offset applied to the network bridge of the second power converter 1b may be ramped down from 133 μs to 100 μs over the course of a few switching periods of the PWM strategy.

The network bridge 14 of any particular power converter can be synchronized to the common time signal by its associated controller 18 as follows.

Without synchronization the PWM strategy of the network bridge 14 will operate at a nominal switching frequency (Fpwm) of 2.5 kHz (i.e. a nominal switching period of 400 μs) as determined independently by each controller 18. The switching period is resolved to a particular timing resolution of 200 ns. Other nominal switching frequencies and timing resolutions are possible and will normally depend on the operating characteristics of the network bridge 14. It is important to note that since the common time signal is measured by each individual controller 18 with respect to its own internal clock, and that the specific PWM switching events for each controller are determined with respect to its own internal clock, then errors in clock frequency between controllers is automatically cancelled and the harmonic cancellation performance is not affected.

The controller 18 includes a PWM timer that is set to run from 0 to 2000 (representing 2000 times 200 ns equals 400 μs for the nominal conditions) before automatically resetting. The PWM timer is the timer against which all timing events for the PWM strategy are determined.

When the controller 18 receives a pulse of the common time signal then this is time stamped against the PWM timer and the value is labelled as Actual_Pulse_Arrival_Time.

The controller 18 also includes a time period timer that measures the time period between successive pulses of the common time signal (nominally 1 second apart). The value of the measured time period is labelled Last_One_Second_Period. The values of the Actual_Pulse_Arrival_Time and the Last_One_Second_Period are measured to the same timing resolution.

After a second pulse of the common time signal has been received by the controller 18, the difference between the actual time when the second pulse was received (i.e., as indicated by the value Actual_Pulse_Arrival_Time) and the time when the second pulse was expected (as indicated by a value Intended_Pulse_Arrival_Time) is determined and the result is labelled Phase_Error. Therefore, for normal operation when each successive pulse of the common time signal arrives at the intended arrival time then the Phase Error should be zero.

The calculation of the Intended_Pulse_Arrival_Time is described below.

The actual switching period of the PWM strategy to be applied to the network bridge 14 in the next nominally 1 second period between successive pulses of the common time signal is therefore calculated as:

$$\text{Switching\_Period} = (\text{Last\_One\_Second\_Period} + \text{Phase\_Error})/Fpwm$$

This calculation is carried out in the switching period following the receipt of a pulse of the common time signal (i.e., nominally every 1 second in this example).

To achieve the necessary phase shift between the network bridges 14 of the first, second and third power converters 1a, 1b and 1c, then the Intended_Pulse_Arrival_Time will be modified by a time offset calculated by:

$$\text{Intended\_Pulse\_Arrival\_Time} = (\text{Time\_Offset} * \text{Switching\_Period}) + \text{Delay\_Comp}$$

where:
Time_Offset is a value in the range of 0 to 100%, and in the present example is 0% for the network bridge 14 of the first power converter 1a, 33.3% for the network bridge of the second power converter 1b and 66.6% for the network bridge of the third power converter 1c; and
Delay_Comp is a time adjustment by which the PWM strategy of the controller 18 is advanced or delayed in order to compensate for delays in the transmission of the common time signal.

In a situation where the supply network has a time-varying frequency (Fnet) then it is possible to vary the actual switching frequency (Fpwm) of the PWM strategy applied to the network bridges 14 using the method of British Patent Application 0617371.0 to achieve only integer harmonics (and preferably only integer odd harmonics) of Fnet. The period of the common time signal can then be set to be equal to the reciprocal of Fpwm with 1 period of the PWM strategy of the network bridges being executed per tick.

The term "integer harmonic" is intended to cover both a harmonic that is an exact integer harmonic value and also a harmonic that is within an agreed tolerance of the exact integer harmonic value. The agreed tolerance (typically in the region of ±5 Hz, for example) will usually be set or determined by the supply network operator or defined in some standard.

A possible algorithm to determine the number of pulses per period of the PWM strategy (Pulse_Number) from a prevailing Fnet, whilst at the same time respecting the maximum switching frequency of the PWM strategy (Fpwm_nom) and using a hysteresis window is given below.

$$\text{Pulse\_Number\_hi} = 2*\text{ROUND}\left(\frac{Fpwm\_nom}{2*Fnet}\right) - 1$$

$$\text{Pulse\_Number\_lo} = 2*\text{ROUND}\left(\frac{Fpwm\_nom}{2*(Fnet + HYSTERESIS)}\right) - 1$$

where ROUND represents a mathematical function that converts the result of the bracketed expression to the nearest integer and HYSTERESIS represents a hysteresis value of Fnet around the changes in Pulse_Number and for the purposes of the following description is 0.25 Hz. Other hysteresis values are possible.

The algorithm produces two values for the Pulse_Number (i.e., Pulse_Number_hi and Pulse_Number_lo) and a further decision must then be made to select which of the values to use. If both of the values are the same then this value is selected as the Pulse_Number. However, if the two values differ then the value that is selected as the Pulse_Number is the value that is the same as the Pulse_Number selected during the previous iteration of the algorithm.

For a first iteration of the algorithm where Fnet is 50.0 Hz and Fpwm_nom is 2.5 kHz, for example, then both Pulse_Number_hi and Pulse_Number_lo will be 49. The selected value for the Pulse_Number will therefore be 49. The actual switching frequency (Fpwm) of the PWM strategy can then be determined according to the following equation:

$$Fpwm = \text{Pulse\_Number} * Fnet$$

If Pulse_Number is 49 then Fpwm is set to 2.450 kHz. Significant harmonics are then created at 2.250 kHz, 2.350 kHz, 2.550 kHz and 2.650 kHz (i.e., 45, 47, 51 and 53 times Fnet since the principal harmonics produced by a double-edged modulated PWM strategy are Fpwm±2*Fnet and Fpwm±4*Fnet where N is a low integer).

Although the Pulse_Number will only vary in discrete steps because of the ROUND function, Fnet will typically vary in a gradual and continuous manner (a general upward or downward "drift" from the nominally fixed frequency of 50 Hz, for example) and this means that Fpwm will also vary in a continuous manner. Accordingly, there is a gradual variation in Fpwm for the ranges of Fnet where the Pulse_Number remains the same, with stepped variations occurring at values of Fnet where the Pulse_Number is discretely adjusted.

The determination of the actual switching frequency (Fpwm) of the PWM strategy necessary to achieve only integer harmonics of Fnet is made by the stand-alone controller 22 and the period of the common time signal is set to be equal to the reciprocal of the determined Fpwm. The period of the common time signal is then measured by the controllers 18 and is used to set the actual period of the PWM strategy applied to each network bridge 14 during operation of the power converters. To make such a determination, the stand-alone controller 22 requires a measurement of Fnet as derived either from one of the transformers 6 or from the supply network via appropriate isolation and attenuation devices (not shown). This measurement is shown in FIG. 1 by the dashed line 26.

The network bridge 14 of any particular power converter can be synchronized to the common time signal by its associated controller 18 as follows.

The controller 18 measures the period of the common time signal and checks to see that it is within acceptable limits. For example, if the minimum switching period of each network bridge 14 is 400 μs then the controller 18 may check to see if the measured period is between 435 μs and 400 μs. The switching period of the PWM strategy to be applied to the associated network bridge 14 is then ramped to the measured period to avoid undesirable step changes. In other words, the switching period of the PWM strategy may be decreased gradually until it reaches the measured period over the course of a few switching periods of the PWM strategy. The ramp function also acts as a filter against noisy pulses of the common time signal.

More particularly, the ramp function applied by the controller 18 may be implemented by:

Ramped_Period=Last_Ramped_Period+SIGN(Measured_Period−Last_Ramped_Period)

and for the next iteration of the ramp function then:

Last_Ramped_Period=Ramped_Period where:
Ramped_Period is the output of the ramp function and represents the period of the PWM strategy that will be applied by the controller 18 for this iteration;
SIGN represents a mathematical function that determines the polarity of the bracketed statement and has a result of +1 when the bracketed statement is positive and −1 when the bracketed statement is negative; and
Measured_Period is the period of the common time signal as measured by the controller 18.

The ramp function therefore adjusts Ramped_Period by a single 200 ns time step per period of the PWM strategy.

To achieve the necessary phase shift between the network bridges 14 of the first, second and third power converters 1a, 1b and 1c, then an Intended_Pulse_Arrival_Time will be modified by a time offset calculated by:

Intended_Pulse_Arrival_Time=
(Time_Offset*Measured_Period)+Delay_Comp where:
Time_Offset is a value in the range of 0 to 100%, and in the present example is 0% for the network bridge 14 of the first power converter 1a, 33.3% for the network bridge of the second power converter 1b and 66.6% for the network bridge of the third power converter 1c; and
Delay_Comp is a time adjustment by which the PWM strategy of the controller 18 is advanced or delayed in order to compensate for delays in the transmission of the common time signal.

In addition:

Phase_Error=Actual_Pulse_Arrival_Time−Intended_Pulse_Arrival_Time where:
Phase_Error is wrapped to be in the range ±0.5 times Measured_Period; and
Actual_Pulse_Arrival_Time is the label given to the pulse of the common time signal received by the controller 18 and time stamped against the PWM timer as described above.

The actual period of the PWM strategy to be applied to the network bridge 14 in a particular iteration is then determined by:

Applied_Period=Ramped_Period+SIGN(Phase_Error)

In an alternative arrangement, one of the controllers 18 can be designated as a "master" controller to provide the common time signal to the remaining "slave" controllers. In this case, the determination of the actual switching frequency (Fpwm) of the PWM strategy necessary to achieve only integer harmonics (and preferably only integer odd harmonics) of the time-varying frequency (Fnet) of the supply network is made by the "master" controller and the period of the common time signal is set to be equal to the reciprocal of the determined Fpwm.

Figure 4:
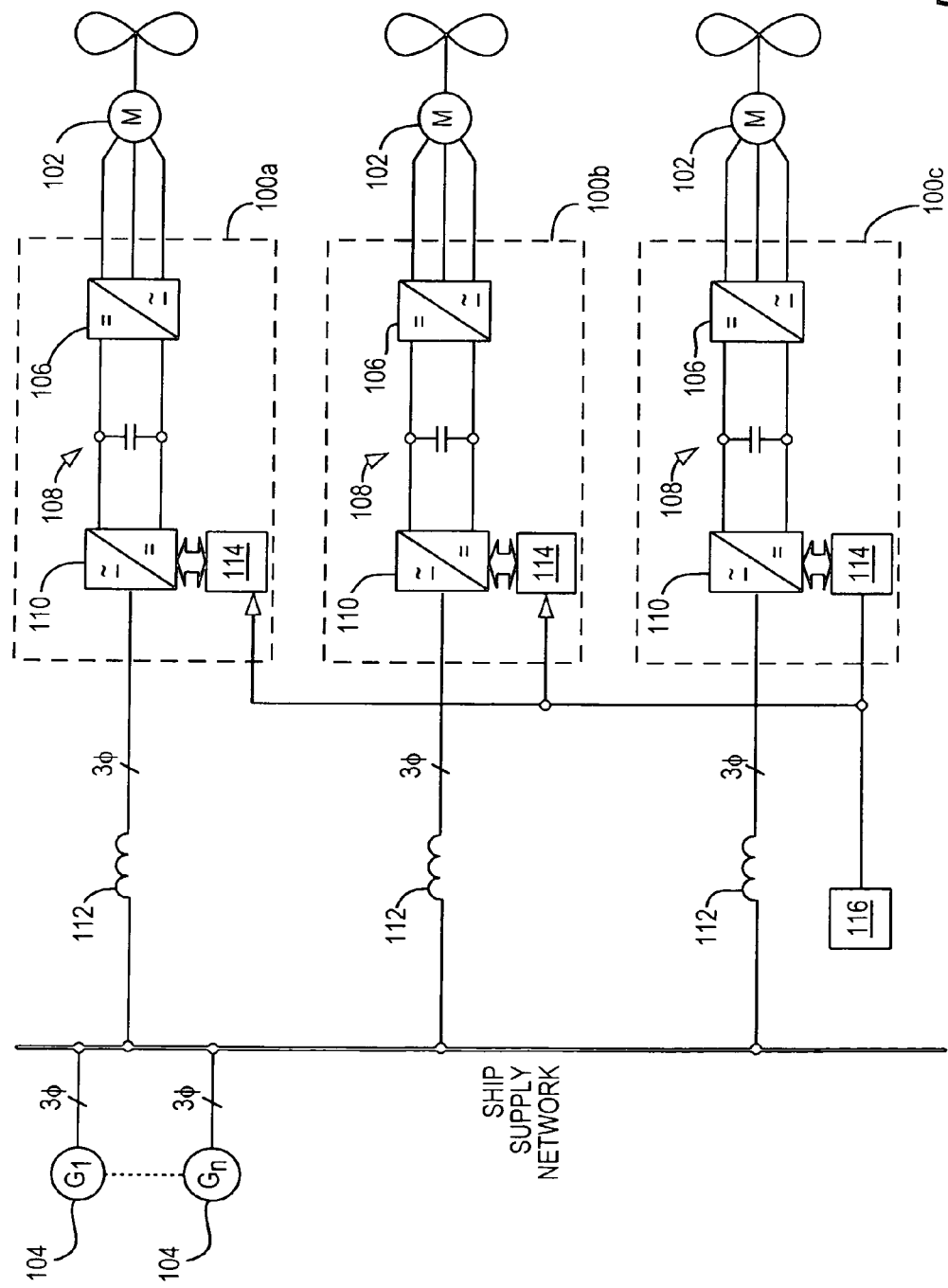
FIG. 4 is a schematic drawing showing how a plurality of power converters according to the present invention can be used for marine propulsion applications to interface between variable speed motor drives and an ac busbar.

The basic topology of a power converter arrangement for marine propulsion applications will be outlined with reference to FIG. 4.

In the basic topology of FIG. 4 three parallel-connected power converters 100a, 100b and 100c are used to interface between variable speed motor drives 102 and a shared ac busbar (labelled SHIP SUPPLY NETWORK). The series of generators 104 of any suitable type supply power to the ac busbar. The ac terminals of each motor drive 102 are connected to the ac terminals of a three-phase motor bridge 106 which in normal operation operates as an active inverter to provide power flow from a dc link 108. The dc terminals of a network bridge 110 are connected to the dc link 108 and in normal operation the network bridge operates as an active rectifier to provide power flow from the ac busbar to the dc link. The ac terminals of the network bridge 110 are connected via a filter 112 to the ac busbar that is shared by other parallel-connected power converter/motor drive combinations. Both the motor bridges 106 and the network bridges 110 have a conventional three-phase two-level topology with a series of semiconductor power switching devices fully controlled and regulated using a PWM strategy. However, in practice the motor bridges 106 and the network bridges 110 can have any suitable topology such a three-level neutral point clamped topology or a multi-level topology (Foch-Maynard arrangement, for example). A suitable network bridge 110 would be the ALSPA MV3000 inverter available from Converteam Ltd of Boughton Road, Rugby, Warwickshire, CV21 1BU, United Kingdom.

Variations that can be considered to the basic topology outlined above include a single motor bridge driving two or more motors or a single network bridge driving two or more motor bridges.

In a marine propulsion application the purpose is to minimize the harmonic voltage distortion on the ac busbar that arises from the plurality of network bridges 110 that are connected to the ac busbar. A controller 114 associated with each network bridge 110 controls the PWM strategy of the network bridge and receives a common time signal from a stand-alone timing controller 116. The stand-alone timing controller 116 can be omitted if the common time signal is generated by one of the controllers 114 as described above. The PWM strategy of each network bridge 110 is then provided with a different phase shift by giving the switching period of the PWM strategy of each network bridge a different time offset relative to the common time signal. The network bridge 110 of any particular power converter can be synchronized to the common time signal by its associated controller 114 as described above. In this way, the harmonic voltage distortion on the ac busbar can be at least partially cancelled.

In the arrangement of FIG. 4, optimum harmonic cancellation will normally be achieved when the time offsets are 0%, 33.3% and 66.6% of the switching period of the PWM strategy applied to the network bridges of the first, second and third power converters 100a, 100b and 100c, respectively. However, there may be other arrangements when optimum harmonic cancellation is achieved using different time offsets. For example, if the first power converter 100a is twice the power rating of the second and third power converters 100b and 100c then improved harmonic cancellation may be achieved if the time offsets are 0%, 50% and 50% of the switching period of the PWM strategy applied to the network bridges of the first, second and third power converters, respectively. Such a difference in power rating would require a corresponding difference in the electrical characteristics of the reactors 112 to realize this benefit.

The present invention can also be applied to static volt-ampere (VAR) compensators (SVCs). The basic topology of a power converter arrangement for SVC applications will be outlined with reference to FIG. 5.

Figure 5:
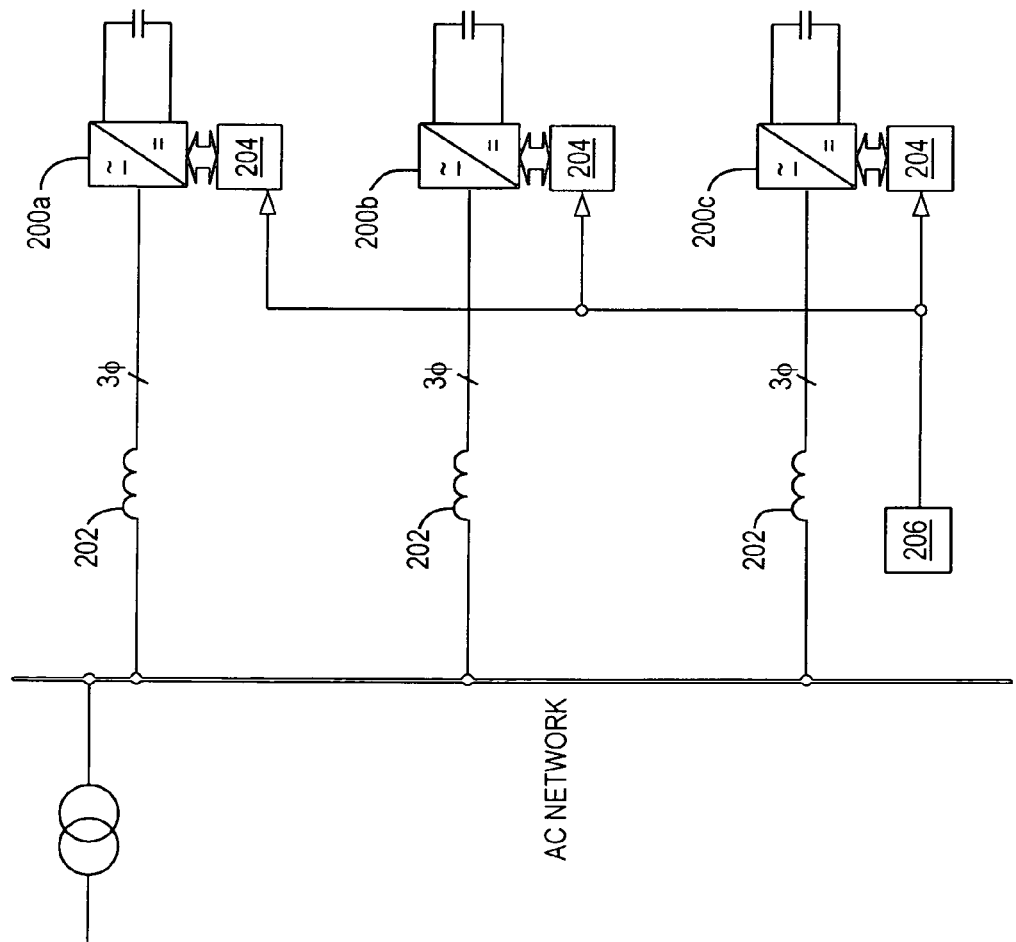
FIG. 5 is a schematic drawing showing how a plurality of power converters according to the present invention can be used for static volt-ampere (VAR) compensator (SVC) applications.

In the basic topology of FIG. 5 the ac terminals of three parallel-connected network bridges 200a, 200b and 200c are connected via a filter 202 to a shared ac network (labelled AC NETWORK). The network bridges 200 are voltage source inverters with a series of semiconductor power switching devices fully controlled and regulated using a PWM strategy. In a SVC application the purpose is to minimize the harmonic voltage distortion on the network that arises from the plurality of network bridges 200 that are connected to the ac network. A controller 204 associated with each network bridge 200 controls the PWM strategy of the network bridge and receives a common time signal from a stand-along timing controller 206. The stand-alone timing controller 206 can be omitted if the common time signal is generated by one of the controllers 204 as described above. The PWM strategy of each network bridge 200 is then provided with a different phase shift by giving the switching period of the PWM strategy of each network bridge a different time offset relative to the common time signal. The network bridge 200 of any particular power converter can be synchronized to the common time signal by its associated controller 204 as described above. In this way, the harmonic voltage distortion on the ac network can be at least partially cancelled.

Cascaded Array

An alternative way of arranging the parallel-connected power converters 1a, 1b and 1c of FIG. 1 will now be described with reference to FIGS. 6 to 11. The arrangement allows for one or more of the controllers 18 to be turned off. It also allows the controllers 18 to have the same parameterization and to be operated using the same firmware. This avoids the need for one of the controllers to be permanently configured as a "master" controller and the remaining controllers to be permanently configured as "slave" controllers.

The controllers 18 are connected together to form a cascaded array. More particularly, each controller 18 includes an input for receiving a time signal from a preceding controller in the array and an output for transmitting a time signal to a succeeding controller in the array. The last controller 18 in the array transmits a time signal to the first controller in the array to complete the connection and form a "closed loop". The cascaded array of the three controllers 18a, 18b and 18c and their associated network bridges 14a, 14b and 14c is shown schematically in FIG. 7. The input and output of each controller 18 can be fiber optic channels so that the time signals are transmitted as optic signals through fiber optic cables, for example. Other means of transmitting the time signals, such as electrical or radio frequency (RF) signalling can be used.

Each controller 18 has the same time offset. For the example shown in FIG. 6 with three parallel-connected power converters then each controller 18 will have a time offset of 33.3% of the switching period of the PWM strategy. The time offset will normally be determined from the number of controllers 18 in the array. For example, the time offset can be 100%/N where N is the number of controllers 18 in the array.

Figure 6:
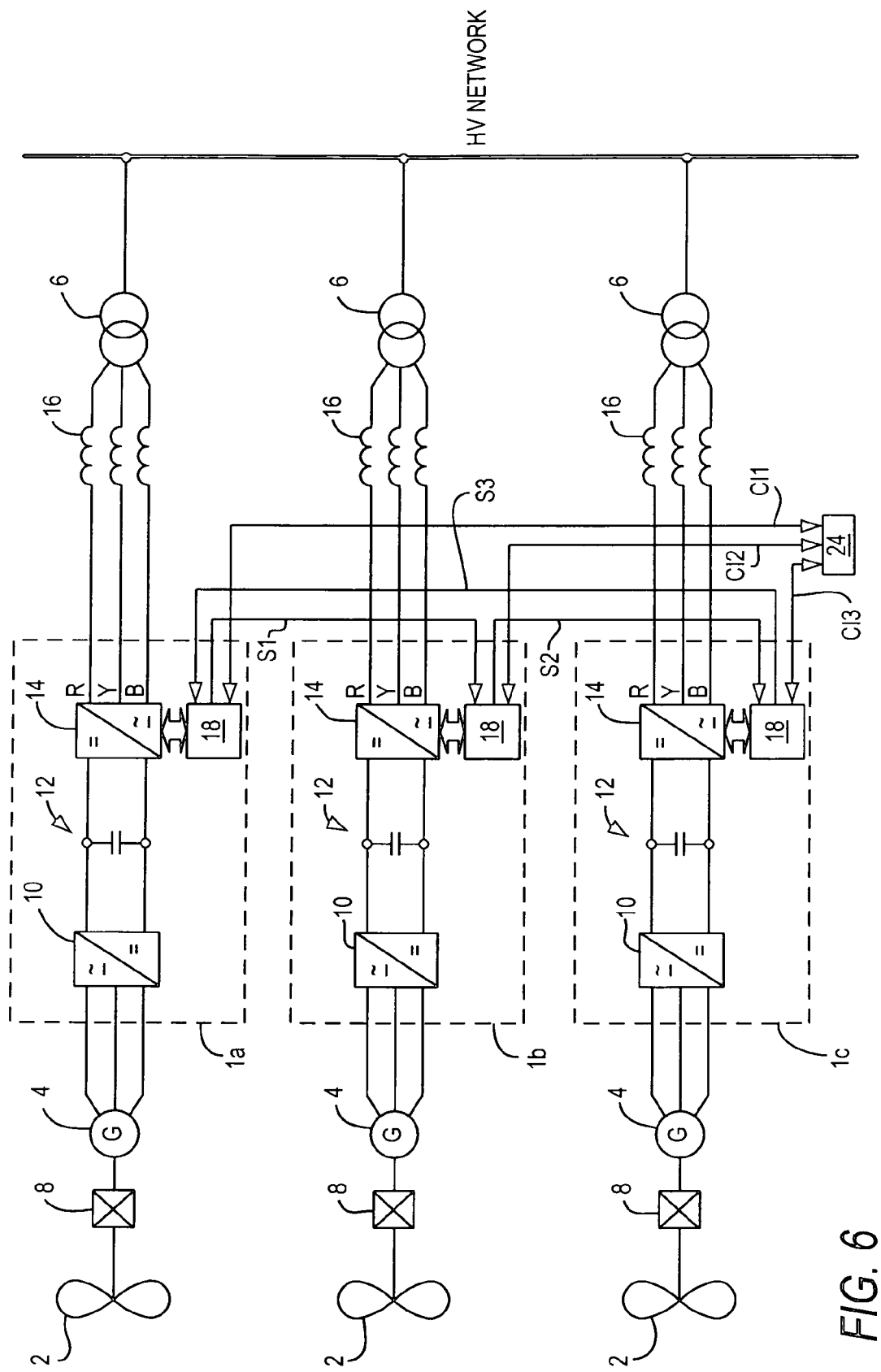
FIG. 6 is a schematic drawing showing how the controllers of the network bridges of the plurality of power converters of FIG. 1 can be connected together in an alternative arrangement to form a cascaded array.

The stand-alone controller 24 receives status information from each of the controllers 18 and transmits connection information (CI1, CI2 and CI3) to each of the controllers as shown in FIG. 6. The connection information includes the number N of controllers 18 in the array at any given time.

Each controller 18 is arranged to transmit a time signal consisting of a series of digital time pulses having states 0 and 1. The pulse period (i.e., the time between the falling edges of successive time pulses) can be measured by each controller 18 and the pulse width of the time pulses (i.e., the period of time during which state 1 applies) can be used to provide information about the position the controller that transmits the time signal has within the array.

The way in which each controller is allocated a role as a "master" or "slave" is described in more detail below. However, in an situation where all three of the power converters 1a, 1b and 1c in the array are connected to the supply network in sequence and operating normally then the controller 18a of the first power converter 1a may be the "master" controller and the controllers of the second and third power converters 1b and 1c may be the "slave" controllers. In this example, the controller 18a of the first power converter 1a outputs to the controller 18b of the second power converter 1b a first time signal S1 having a pulse width of 20 µs and a pulse period equal to the switching period of the PWM strategy of its network bridge 14a. A falling edge of the first time signal S1 is aligned with the start of the switching period of the PWM strategy of its network bridge 14a and acts as the time datum against which the time offsets of the switching periods of the PWM strategies of the network bridges 14b and 14c will be referenced.

Figure 8:
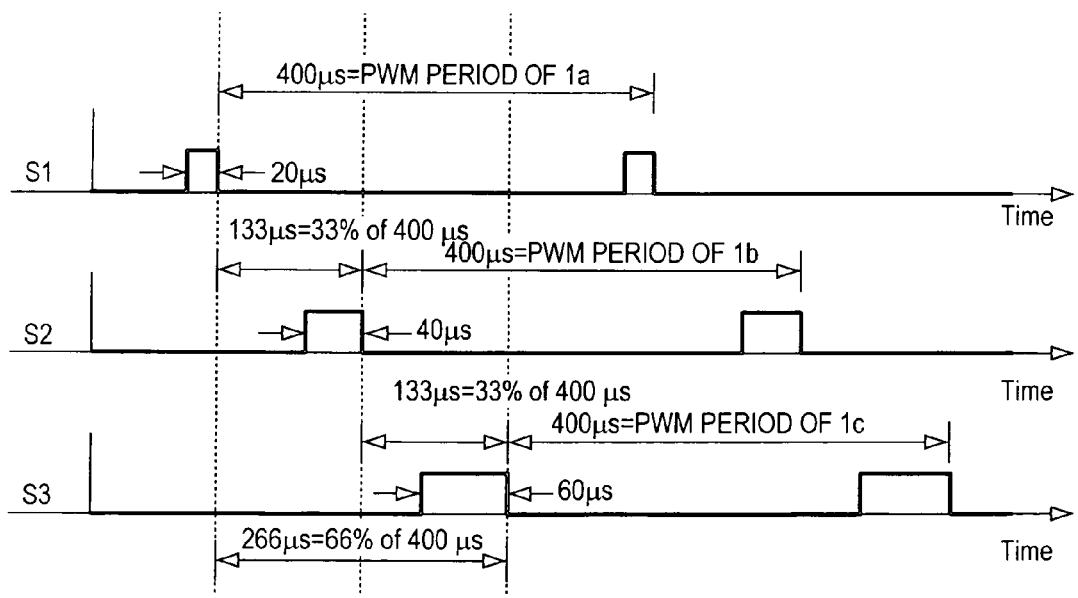
FIG. 8 is a schematic drawing showing the time signals transmitted by the controllers in the cascaded array of FIG. 6 in the first operating mode.

The controller 18b of the second power converter 1b receives the first time signal S1 having a pulse width of 20 µs. It measures the pulse period of the first time signal S1, sets the switching period of the PWM strategy of its network bridge 14b to match the measured pulse period and applies a time offset that is equal 33.3% of the measured pulse period. This time offset is used to determine the start of the switching period of the PWM strategy of the network bridge 14b of the second power converter 1b. For example, as shown in FIG. 8 the switching period of the PWM strategy of the network bridge 14b, which in this case is 400 µs, is offset by 133 µs from the falling edge of the first time signal S1 (i.e., the time datum). The controller 18b of the second power converter 1b outputs a second time signal S2 having a pulse width equal to the pulse width of the first time signal S1 plus 20 µs (i.e., a pulse width of 40 µs) and a pulse period equal to the switching period of the PWM strategy of its network bridge 14b, which has been set to be the same as the switching period of the PWM strategy of the network bridge 14a of the first power converter 1a. A falling edge of the second time signal S2 is aligned with the start of the switching period of the PWM strategy of its network bridge 14b.

The controller 18c of the third power converter 1c receives the second time signal S2 having a pulse width of 40 µs. It measures the pulse period of the second time signal S2, sets the switching period of the PWM strategy of its network bridge 14c to match the measured pulse period and applies a time offset that is equal to 33.3% of the measured pulse period. This time offset is used to determine the start of the switching period of the PWM strategy of the network bridge 14c of the third power converter 1c. For example, as shown in FIG. 8 the switching period of the PWM strategy of the network bridge 14c is offset by 133 µs from the falling edge of the second time signal S2. It will also be readily appreciated from FIG. 8 that the switching period of the PWM strategy of the network bridge 14c is offset by 266 µs from the falling edge of the first time signal S1 (i.e., the time datum). The controller 18c of the third power converter 1c outputs a third time signal S3 having a pulse width equal to the pulse width of the second time signal S2 plus 20 µs (i.e., a pulse width of 60 µs) and a pulse period equal to the switching period of the PWM strategy of its network bridge 14c, which has been set to be the same as the switching period of the PWM strategy of the network bridge 14b of the second power converter 1b and which in turn has been set to be the same as the switching period of the PWM strategy of the network bridge 14a of the first power converter 1a. A falling edge of the third time signal S3 is aligned with the start of the switching period of the PWM strategy of its network bridge 14c.

The controller 18a of the first power converter 1a receives the third time signal S3 having a pulse width of 60 µs that confirms its role as a "master" controller and its operation remains unchanged.

The time signals S1, S2 and S3 transmitted by the controllers in the example where the controller 18a of the first power converter 1a is the "master" controller, the controller 18b of the second power converter 1b is the first "slave" controller and the controller 18c of the third power converter 1c is the second "slave" controller are shown schematically in FIG. 8.

The switching period of the PWM strategy applied to the network bridges 14b and 14c of the second and third power converters 1b and 1c, respectively, is determined by the "master" controller 18a of the first power converter 1a and is transmitted to the "slave" controllers 18b and 18c by means of the first and second time signals S1 and S2. The time offsets applied to the switching periods of the PWM strategies are additive and the network bridges 14a, 14b and 14c of the first, second and third power converters are therefore operated in accordance with PWM strategies where the switching periods are offset by 0%, 33.3% and 66.6% of the measured pulse period, respectively.

The controllers 18 are determined to be a "master" controller or a "slave" controller depending on when they come on-line. The controller of the power converter in the array that is the first to come on-line preferably assumes a role as a "master" controller and takes a position as the first controller in the array. Any controller that receives a time signal when its power converter comes on-line will preferably assume a role as a "slave" controller. Any "slave" controller that fails to receive a time signal for any reason (i.e., the immediately preceding controller in the array goes off-line or the time signal is disrupted) may assume a role as a "master" controller.

It will be readily appreciated that an array may start out by having two or more "master" controllers depending on the order in which the power converters come on-line. An array may also end up having two or more "master" controllers if one or more power converter goes off-line. In this case the array is effectively divided into a series of sub-arrays, each sub-array having its own "master" controller adopting a position as the first controller within the sub-array. However, when all of the power converters in the array are on-line and operating properly then there will only be one "master" controller.

In a situation where the array is effectively divided into a series of sub-array, the stand-alone controller 24 may transmit connection information to optimize harmonic cancellation for each sub-array rather than for the array as a whole. For example, if the array consists of seven power converters and the third and seventh power converters go off-line then the array will effectively be divided into two sub-arrays: a first sub-array of the first and second power converters and a second sub-array of the fourth, fifth and sixth power converters. In this situation, the stand-alone controller 24 will receive status information from five controllers 18. In a basic arrangement it would therefore be possible for the stand-alone controller 24 to transmit connection information where N=5 such that the controllers 18 that are on-line would apply a time offset of 20%. The problem with this is that there is no time relationship between the sub-arrays. The stand-alone controller 24 is therefore preferably configured so as to determine the location and status of the power converters in array (i.e., it has a "mapping" capability). In this situation, the stand-alone controller 24 can optimize harmonic cancellation at the level of the sub-array. For example, the stand-alone controller 24 can transmit connection information to the controllers of the first sub-array where N=2 and can transmit connection information to the controllers of the second sub-array where N=3. There is still no time relationship between the two sub-arrays, but the harmonic cancellation within each sub-array is optimised leading to an overall improvement. This provides a gradual degradation in performance as power converters go off-line.

In general terms, each controller 18 is preferably configured to remain a "master" controller if it receives no time signal or a time signal having a pulse width of N*20 μs but to switch from its role as a "master" controller to a "slave" controller if it receives a time signal having a pulse width of 20 μs or (N−1)*20 μs or less, where N is the number of power converters in the array or sub-array.

In some cases, it may be appropriate to provide protection against false timing signals. For example, if the pulse period of the received time signal is outside a predetermined tolerance or range (i.e., 400 μs≦pulse period≦435 μs) then the controller 18 may adopt a role as a "master" controller or take the associated power converter off-line.

The following examples explain how the cascaded array of three controllers shown in FIG. 6 may operate in different circumstances.

1. The first power converter 1a is the first to come on-line and its controller 18a takes a role as a "master" controller and the first position in the array. It uses a local determination of the switching period of the PWM strategy of the network bridge 14a of the first power converter 1a and outputs a first time signal S1 having a pulse width of 20 μs and a pulse period equal to the switching period of the PWM strategy of the network bridge 14a of the first power converter 1a. A falling edge of the first time signal S1 is aligned with the start of the switching period of the PWM strategy of the network bridge 14a of the first power converter 1a. The second power converter 1b is the next to come on-line and its controller 18b receives the first time signal S1. It takes a role as a "slave" controller because it is receiving a time signal and the second position in the array. The controller 18b measures the pulse period of the first time signal S1, sets the switching period of the PWM strategy of its network bridge 14b to match the measured pulse period and applies a time offset that is equal to the measured pulse period divided by N, where N is the number of power converters that are on-line at any given time and is transmitted to the controllers by the stand-alone controller 24 in the form of connection information. (For a fixed configuration, this connection information can be defined by a parameter stored in the controllers.) This time offset is used to determine the start of the switching period of the PWM strategy of the network bridge 14b of the second power converter 1b. Controller 18b outputs a second time signal S2 having a pulse width equal to the pulse width of the first time signal S1 plus 20 μs (i.e., a pulse width of 40 μs) and a pulse period equal to the switching period of the PWM strategy of the network bridge 14b of the second power converter 1b. A falling edge of the second time signal S2 is aligned with the start of the switching period of the PWM strategy of the network bridge 14b of the second power converter 1b. The third power converter 1c is the last to come on-line and its controller 18c receives the second time signal S2. It takes a role as a "slave" controller because it is receiving a time signal and the third position in the array. The controller 18c measures the pulse period of the second time signal S2, sets the switching period of the PWM strategy of its network bridge 14c to match the measured pulse period and applies a time offset that is equal to the measured pulse period divided by N. This time offset is used to determine the start of the switching period of the PWM strategy of the network bridge 14c of the third power converter 1c. Controller 18c outputs a third time signal S3 having a pulse width equal to the pulse width of the second time signal S2 plus 20 μs (i.e. a pulse width of 60 μs) and a pulse period equal to the switching period of the PWM strategy of the network bridge 14c of the third power converter 1c. A falling edge of the third time signal S3 is aligned with the start of the switching period of the PWM strategy of the network bridge 14c of the third power converter 1c. Controller 18a of the first power converter 1a receives the third time signal S3 having a pulse width of 60 μs that confirms its role as a "master" converter and its operation remains unchanged.

Figure 7:
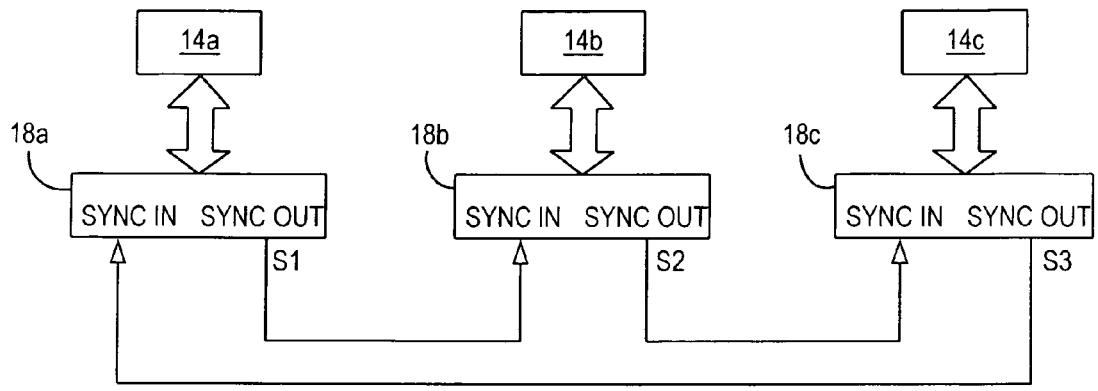
FIG. 7 is a schematic drawing showing the cascaded array of FIG. 6 in a first operating mode.

The array is therefore configured in the order: controller 18a→controller 18b; controller 18b→controller 18c; controller 18c→controller 18a as shown in FIG. 7.

2. The array of example 1. above functions normally until the first power converter 1a goes off-line or the first time signal S1 is disrupted. Controller 18b of the second power converter 1b no longer receives a time signal and takes a role as a "master" controller and the first position in the array. It uses a local determination of the switching period of the PWM strategy of the network bridge 14b of the second power converter 1b and now outputs a first time signal S1 having a pulse width of 20 μs and a pulse period equal to the switching period of the PWM strategy of the network bridge 14b of the second power converter 1b. A falling edge of the first time signal S1 output by controller 18b is aligned with the start of the switching period of the PWM strategy of the network bridge 14b of the second power converter 1b. Controller 18c of the third power converter 1c now receives the first time signal S1. It takes a role as a "slave" controller because it is receiving a time signal but now takes the second position in the array. The controller 18c measures the pulse period of the first time signal S1, sets the switching period of the PWM strategy of its network bridge 14c to match the measured pulse period and applies a time offset that is equal to the measured pulse period divided by N. This time offset is used to determine the start of the switching period of the PWM strategy of the network bridge 14c of the third power converter 1c. Controller 18c now outputs a second time signal S2 having a pulse width equal to the pulse width of the first time signal S1 plus 20 µs (i.e., a pulse width of 40 µs) and a pulse period equal to the switching period of the PWM strategy of the network bridge 14c of the third power converter 1c. A falling edge of the second time signal S2 is aligned with the start of the switching period of the PWM strategy of the network bridge 14c of the third power converter 1c. When the first power converter 1a comes back on-line the controller 18a receives the second time signal having a pulse width of 40 µs. It takes a role as a "slave" power converter because it is receiving a time signal and the third position in the array. It measures the pulse period of the second time signal S2, sets the switching period of the PWM strategy of its network bridge 14a to match the measured pulse period and applies a time offset that is equal to the measured pulse period divided by N. This time offset is used to determine the start of the switching period of the PWM strategy of the network bridge 14a of the first power converter 1a. Controller 18a outputs a third time signal S3 having a pulse width equal to the pulse width of the second time signal plus 20 µs (i.e., a pulse width of 60 µs) and a pulse period equal to the switching period of the PWM strategy of the network bridge 14a of the first power converter 1a. A falling edge of the third time signal S3 output by controller 18a is aligned with the start of the switching period of the PWM strategy of the network bridge 14a of the first power converter 1a. Controller 18b of the second power converter 1b receives the third time signal S3 having a pulse width of 60 µs that confirms its role as a "master" power converter and its operation remains unchanged.

Figure 9:
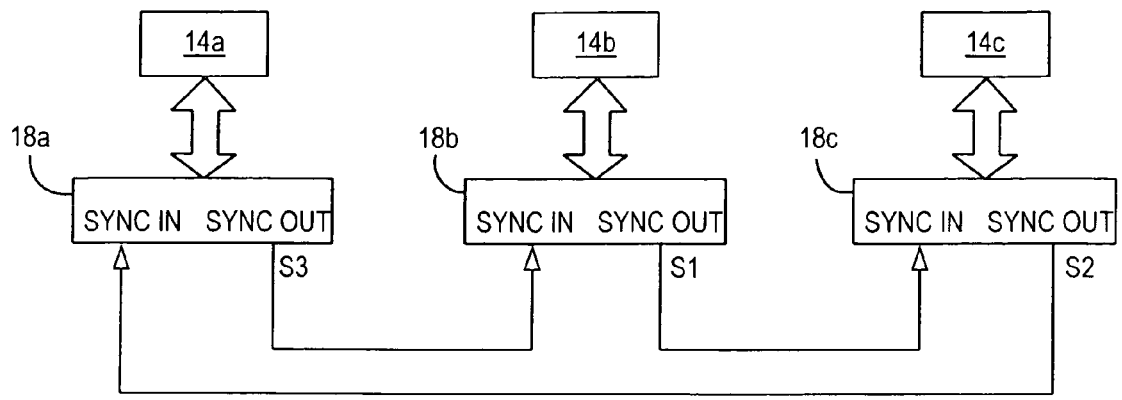
FIG. 9 is a schematic drawing showing the cascaded array of FIG. 6 in a second operating mode.

Following the interruption of the first time signal S1, the array is re-configured in the order: controller 18b→controller 18c; controller 18c→controller 18a; controller 18a→controller 18b as shown in FIG. 9.

3. The first power converter 1a is the first to come on-line and its controller 18a takes a role as a "master" controller and the first position in the array. It uses a local determination of the switching period of the PWM strategy of the network bridge 14a of the first power converter 1a and outputs a first time signal S1 having a pulse width of 20 µs and a pulse period equal to the switching period of the PWM strategy of the network bridge 14a of the first power converter 1a. A falling edge of the first time signal S1 is aligned with the start of the switching period of the PWM strategy of the network bridge 14a of the first power converter 1a. The third power converter 1c is the second to come on-line and its controller 18c takes a role as a "master" controller and the first position in the array. It uses a local determination of the switching period of the PWM strategy of the network bridge 14c of the third power converter 1c and outputs a first time signal S1 having a pulse width of 20 µs and a pulse period equal to the switching period of the PWM strategy of the network bridge 14c of the third power converter 1c. A falling edge of the first time signal S1 is aligned with the start of the switching period of the PWM strategy of the network bridge 14c of the third power converter 1c. The controller 18a of the first power converter 1a now receives the first time signal S1 output by controller 18c having a pulse width of 20 µs. It therefore switches from its role as a "master" power converter to a "slave" power converter and takes the second position in the array. The controller 18a measures the pulse period of the first time signal S1, sets the switching period of the PWM strategy of its network bridge 14a to match the measured pulse period and applies a time offset that is equal to the measured pulse period divided by N. This time offset is used to determine the start of the switching period of the PWM strategy of the network bridge 14a of the first power converter 1a. Controller 18a outputs a second time signal S2 having a pulse width equal to the pulse width of the first time signal S1 plus 20 µs (i.e., a pulse width of 40 µs) and a pulse period equal to the switching period of the PWM strategy of the network bridge 14a of the first power converter 1a. A falling edge of the second time signal S2 is aligned with the start of the switching period of the PWM strategy of the network bridge 14a of the second power converter 1a.

Figure 10:
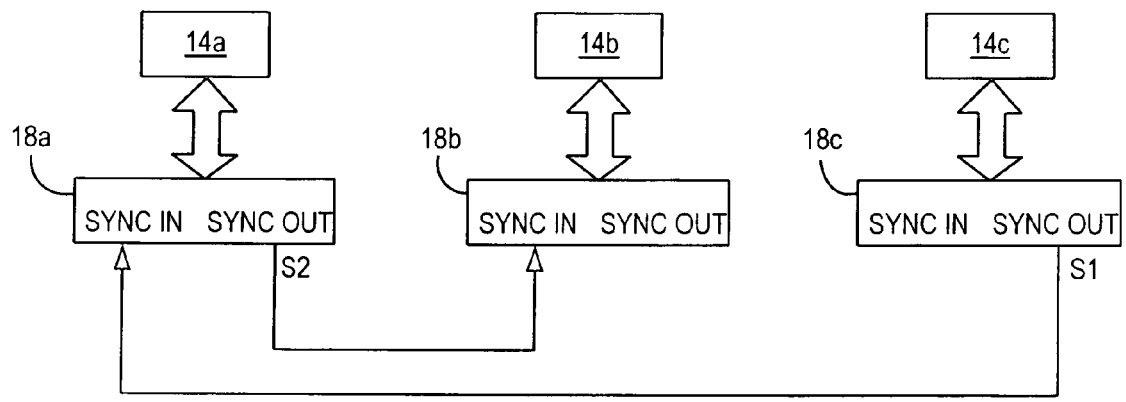
FIG. 10 is a schematic drawing showing the cascaded array of FIG. 6 in a third operating mode.

At this point in time, the array is therefore configured in the order: controller 18c→controller 18a; controller 18a→as shown in FIG. 10.

When the second power converter 1b comes on-line its controller 18b receives the second time signal S2 having a pulse width of 40 µs. It takes a role as a "slave" controller because it is receiving a time signal and the third position in the array. The controller 18b measures the pulse period of the second time signal S2, sets the switching period of the PWM strategy of its network bridge 14b to match the measured pulse period and applies a time offset that is equal to the measured pulse period divided by N. This time offset is used to determine the start of the switching period of the PWM strategy of the network bridge 14b of the second power converter 1b. Controller 18b outputs a third time signal S3 having a pulse width equal to the pulse width of the second time signal S2 plus 20 µs (i.e., a pulse width of 60 µs) and a pulse period equal to the switching period of the PWM strategy of the network bridge 14b of the second power converter 1b. A falling edge of the third time signal S3 is aligned with the start of the switching period of the PWM strategy of the network bridge 14b of the second power converter 1b. Controller 18c of the third power converter 1c receives the third time signal S3 having a pulse width of 60 µs that confirms its role as a "master" converter and its operation remains unchanged.

Figure 11:
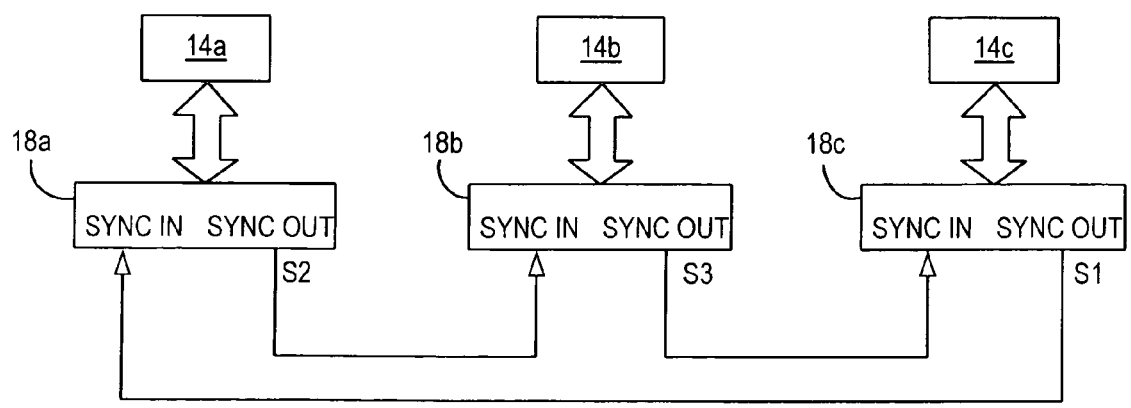
FIG. 11 is a schematic drawing showing the cascaded array of FIG. 6 in a fourth operating mode.

The array is therefore configured in the order: controller 18c→controller 18a; controller 18a→controller 18b; controller 18b→controller 18c as shown in FIG. 11.

In the arrangement of FIG. 6 all of the controllers in the array make an independent local determination of the switching period of the PWM strategy to be applied to the network bridge of its associated power converter in the event that they assume a role as a "master" converter. The switching period of the PWM strategy may be fixed (either based on an external time signal of known duration divided by the nominal switching frequency of the PWM strategy or a fixed number such as 400 µs, for example) or may be variable and determined using the method of British Patent Application 0617371.0, for example. When a controller assumes a role as a "slave" power converter then the switching period of the PWM strategy to be applied to the network bridge of its associated power converter is determined by measuring the pulse period of the received time signal. The switching period of the PWM strategy applied to the network bridges associated with a "slave" controller is therefore determined solely by the relevant "master" controller.

The network bridges 110 and 200 of FIGS. 4 and 5, respectively, may also be connected together to form a cascaded array as described above.

Details of Harmonic Cancellation

The performance of the harmonic cancellation achieved by the power converter arrangement for wind turbine applications of FIG. 1 will now be described in more detail.

If it is assumed that each network bridge 14 is operated according to a PWM strategy with a nominal switching frequency of 2.5 kHz and the frequency of the supply network is 50 Hz then the principle harmonics generated by each power converter in the output voltage seen at the 690V parallel connections (i.e. the connections between the respective step-down transformers 6 and the supply network) are related to the first harmonic of the switching frequency of the PWM strategy. More particularly, sidebands are produced as a result of beat frequency effects with significant harmonics at 2.3 kHz, 2.4 kHz, 2.6 kHz and 2.7 kHz (i.e., 46, 48, 52 and 54 times the nominally fixed frequency of the supply network). It will be noted that the fundamental voltage has an rms value of 690V and is therefore beyond the range of the y-axis of the graphs of FIGS. 12 to 14.

Figure 12:
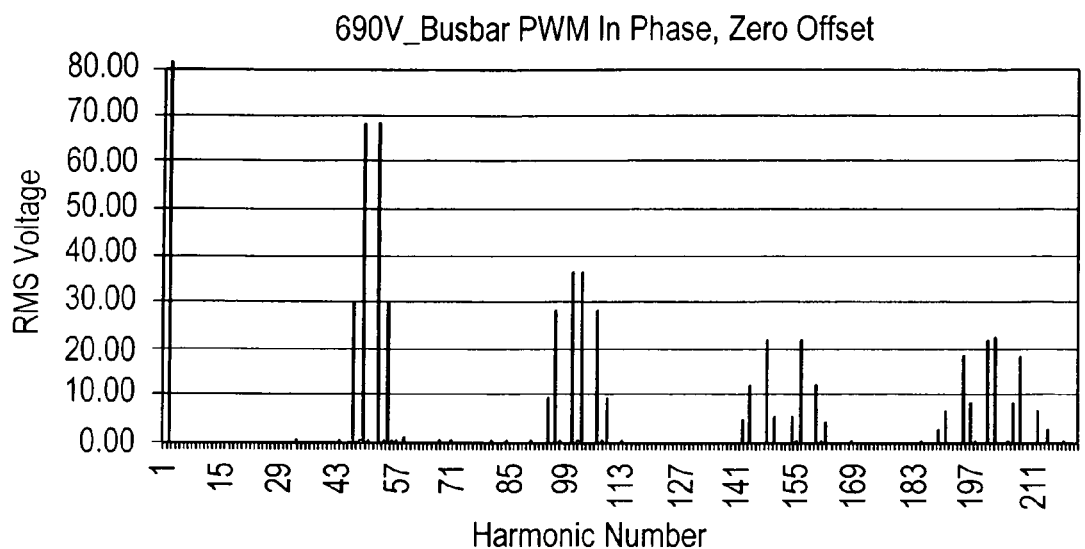
FIG. 12 is a graph of rms voltage versus harmonic number for three parallel-connected power converters where the PWM strategies of the network bridges have zero time offset.

If all of the network bridges 14 are operated with the same time offset and with the common time signal of FIG. 1 then the harmonics seen at the 690V parallel connections are additive. This is shown in FIG. 12. It should be noted that the rms voltages at harmonic numbers 48 and 52 have amplitudes of approximately 70V rms. Also, the rms voltages at harmonic numbers 99 and 101 have amplitudes of approximately 40V rms. (These particular sidebands relate to the beat frequency effects between the second harmonic of the switching frequency of the PWM strategy and the network frequency.)

If the network bridges 14 of the power converters 1a, 1b and 1c are operated with a time offset of 0%, 33.3% and 66.6% of the switching period of the PWM strategy, respectively, then the harmonics arising from the beat frequency effects at the first and second harmonics of the switching frequency of the PWM strategy and the network frequency are cancelled. This is shown clearly in FIG. 13. It should be noted that the first significant disturbances occur at harmonic numbers in the region of 150 where the particular sidebands relate to the beat frequency effects between the third harmonic of the switching frequency of the PWM strategy and the network frequency. Moreover, harmonics arising from the beat frequency effects at the fourth and certain other subsequent harmonics of the switching frequency of the PWM strategy are also cancelled.

Figure 13:
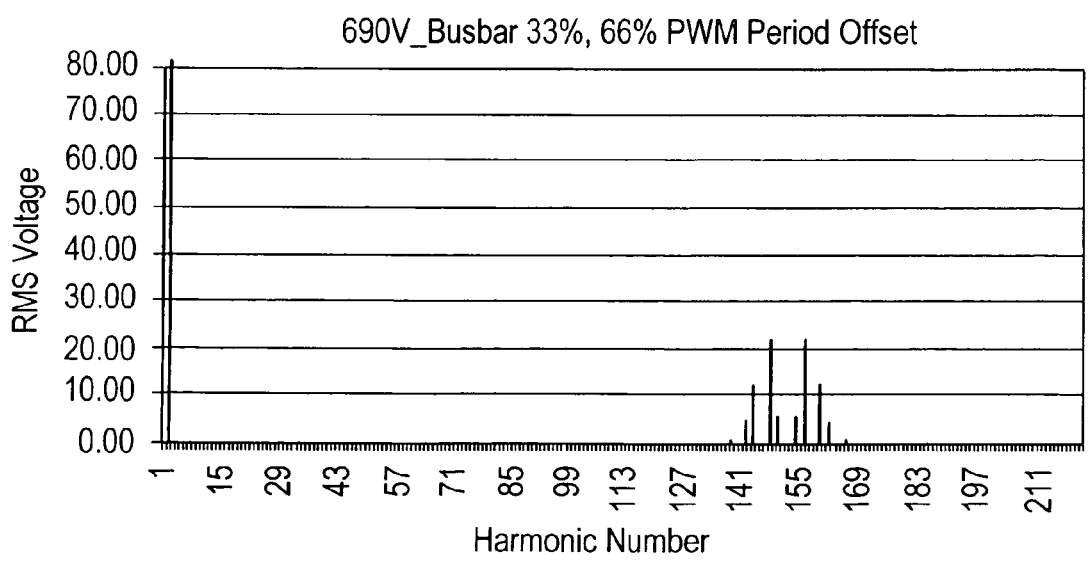
FIG. 13 is a graph of rms voltage versus harmonic number for three parallel-connected power converters where the PWM strategies of the network bridges have time offsets of 0%, 33.3% and 66.6% of the switching period, respectively.
Figure 14:
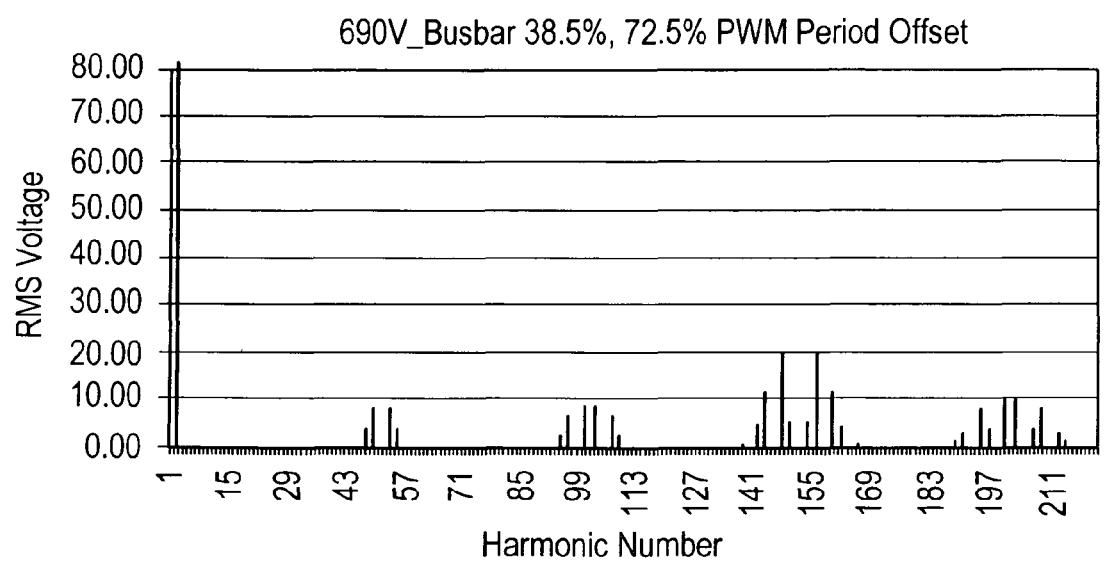
FIG. 14 is a graph of rms voltage versus harmonic number for three parallel-connected power converters where the PWM strategies of the network bridges have time offsets of 0%, 38.5% and 72.5% of the switching period, respectively.

In practice, the ideal performance of the present invention shown in FIG. 13 may be degraded. For example, ideal time offsets may not be achieved because of delays in the transmission of the common time signal or synchronisation errors. However, even if the network bridges 14 of the power converters 1a, 1b and 1c are operated with less than ideal time offsets of 0%, 38.5% and 72.5%, respectively, then it can be seen from FIG. 14 that the rms voltages at harmonic numbers 48, 52, 99 and 101 have reduced amplitudes of less than 10V rms, compared to the results shown in FIG. 12.

Higher order harmonic voltage distortion may also be produced in the supply network but it is not considered to be significant for the purposes of this description and may be reduced by the use of shunt filters (not shown) that are responsive to these higher order harmonic voltages.

Similar results to those shown in FIG. 13 will also be achieved for the cascaded-array shown in FIG. 6 if each controller 18 applies a time offset of 33.3%.

It will be readily appreciated that harmonic cancellation for the marine propulsion applications and static volt-ampere (VAR) compensator (SVC) applications of FIGS. 4 and 5, respectively, will be achieved in a similar manner.

What is claimed is:

1. A method of controlling a plurality of power converters that can be used to interface to an ac supply network, each power converter comprising a network bridge having ac terminals connected to the ac supply network, the network bridge operating in accordance with a pulse width modulation (PWM) strategy represented by a carrier waveform having the same switching period and which causes at least one unwanted harmonic in the supply network voltage, the method comprising the steps of:
   generating, by a first power converter, a time signal to act as a time datum;
   transmitting, by the first power converter, the time signal to at least a second power converter; and
   providing the switching period of the PWM strategy of each network bridge with a different time offset relative to the time signal to provide a different phase shift in the carrier waveform such that the at least one unwanted harmonic in the supply network voltage is at least partially cancelled.

2. The method according to claim 1, further comprising the step of setting the switching period of the PWM strategy of each network bridge to be equal to the period of the time signal.

3. The method according to claim 1, wherein the period of the time signal is fixed.

4. The method according to claim 1, wherein the supply network operates at a time-varying frequency and each network bridge operates in accordance with a PWM strategy having a switching frequency, a nominal switching frequency and a number of pulses per period, the method comprising the steps of:
   varying the switching frequency of the PWM strategy in accordance with the time-varying frequency of the supply network to achieve only integer harmonics of the time-varying frequency; and
   setting the period of the time signal to be equal to the reciprocal of the switching frequency of the PWM strategy that achieves only integer harmonics of the time-varying frequency.

5. The method according to claim 1, further comprising the steps of:
   determining the number of power converters connected to the supply network;
   determining the switching period of the PWM strategy of the network bridge of the first power converter;
   transmitting the time signal having a pulse period equal to the switching period of the PWM strategy of the network bridge of the first power converter to the second power converter to act as the time datum;
   measuring the pulse period of the time signal;
   setting the switching period of the PWM strategy of the network bridge of the second power converter to be same as the measured pulse period of the time signal; and
   offsetting the switching period of the PWM strategy of the network bridge of the second power converter relative to the time signal by a time period that is substantially equal to the measured pulse period of the time signal divided by the number of power converters connected to the supply network such that the at least one unwanted harmonic in the supply network voltage is at least partially cancelled.

6. The method according to claim 5, wherein N power converters are connected to the supply network and arranged in an array from the first power converter to the Nth power converter.

7. The method according to claim 6, further comprising the steps of:
transmitting an Nth time signal having a pulse period equal to the switching period of the PWM strategy of the network bridge of the Nth power converter in the array to the first power converter in the array.

8. The method according to claim 6, further comprising the steps of:
determining which power converter in the array of N power converters is the first to come on-line; and
this power converter assuming a role as a "master" power converter and taking a position as the first power converter in the array.

9. The method according to claim 6, further comprising the steps of:
determining if a power converter in the array of N power converters receives the time signal when it comes on-line; and
this power converter assuming a role as a "slave" power converter in the array.

10. The method according to claim 6, wherein the time signals transmitted between adjacent power converters in the array of N power converters contains information about the role and/or the position of the power converter that transmits the time signal has in the array.

11. The method according to claim 6, wherein the time signals transmitted between adjacent power converters in the array of N power converters have the same pulse period.

12. The method according to claim 6, wherein the time signals transmitted between adjacent power converters in the array of N power converters have different pulse widths that are indicative of the position of the power converter that transmits the time signal has in the array.

13. The method according to claim 12, wherein the pulse width of the Nth time signal that is transmitted to the first power converter in the array of N power converters is used by the first power converter to confirm its role as a "master" power converter.

14. The method according to claim 1, wherein the time offset associated with one or more of the network bridges is adjusted if the number of power converters that are connected to the supply network changes.

15. The method according to claim 1, wherein each power converter transmits status information to say if it is on-line or off-line.

16. The method according to claim 1, wherein connection information about the number of power converters that are connected to the supply network at any given time is transmitted to all of the power converters.

17. The method according to claim 16, wherein the connection information is transmitted periodically.

18. The method according to claim 16, wherein the connection information is transmitted when the number of power converters that are on-line changes.

19. A plurality of power converters that can be used to interface to an ac supply network, each power converter comprising a network bridge having ac terminals connected to the ac supply network, the network bridge operating in accordance with a pulse width modulation (PWM) strategy represented by a carrier waveform having the same switching period and which causes at least one unwanted harmonic in the supply network voltage and a controller, wherein a time signal that acts as a time datum is generated by a first power converter and is transmitted to at least a second power converter, and wherein the controllers of the plurality of power converters are arranged to provide the switching period of the PWM strategy of each network bridge with a different time offset relative to the time signal to provide a different phase shift in the carrier waveform such that the at least one unwanted harmonic in the supply network voltage is at least partially cancelled.

20. The plurality of power converters according to claim 19, wherein the controllers are adapted to set the switching period of the PWM strategy of each network bridge to be equal to the period of the time signal.

21. The plurality of power converters according to claim 19, wherein the period of the time signal is fixed.

22. The plurality of power converters according to claim 19, wherein the supply network operates at a time-varying frequency and the network bridge of each power converter operates in accordance with a PWM strategy having a switching frequency, a nominal switching frequency and a number of pulses per period, wherein the controllers are adapted to vary the switching frequency of the PWM strategy in accordance with the time-varying frequency of the supply network to achieve only integer harmonics of the time-varying frequency and to set the period of the common time signal to be equal to the reciprocal of the switching frequency of the PWM strategy that achieves only integer harmonics of the time-varying frequency.

23. The plurality of power converters according to claim 19, wherein the time signal having a pulse period equal to a switching period of the PWM strategy of the network bridge of the first power converter is transmitted to the second power converter to act as the time datum and the controller of the second power converter is adapted to:
measure the pulse period of the time signal;
set the switching period of the PWM strategy of the network bridge of the second power converter to be same as the measured pulse period of the time signal; and
offset the switching period of the PWM strategy of the network bridge of the second power converter relative to the time signal by a time period that is substantially equal to the measured pulse period of the time signal divided by the number of power converters connected to the supply network such that the at least one unwanted harmonic in the supply network voltage is at least partially cancelled.

24. The plurality of power converters according to claim 23, wherein N power converters are connected to the supply network and arranged in an array from the first power converter to the Nth power converter.

25. The plurality of power converters according to claim 24, wherein an Nth time signal having a pulse period equal to the switching period of the PWM strategy of the network bridge of the Nth power converter in the array is transmitted to the first power converter in the array.

26. The plurality of power converters according to claim 24, wherein time signals transmitted between adjacent power converters in the array of N power converters contain information about the role and/or the position of the power converter that transmits the time signal has in the array.

27. The plurality of power converters according to claim 24, wherein time signals transmitted between adjacent power converters in the array of N power converters have the same pulse period.

28. The plurality of power converters according to claim 24, wherein time signals transmitted between adjacent power converters in the array of N power converters have different pulse widths that are indicative of the position of the power converter that transmits the time signal has in the array.

29. The plurality of power converters according to claim 28, wherein the pulse width of the Nth time signal that is transmitted to the first power converter in the array of N power converters is used by the first power converter to confirm its role as a "master" power converter.

30. The plurality of power converters according to claim 19, wherein the time offset associated with one or more of the network bridges is adjusted if the number of power converters that are connected to the supply network changes.

31. The plurality of power converters according to claim 19, wherein each power converter transmits status information to say if it is on-line or off-line.

32. The plurality of power converters according to claim 19, wherein connection information about the number of power converters that are connected to the supply network at any given time is transmitted to all of the power converters.

33. The plurality of power converters according to claim 32, wherein the connection information is transmitted periodically.

34. The plurality of power converters according to claim 32, wherein the connection information is transmitted when the number of power converters that are on-line changes.

35. The plurality of power converters according to claim 19, wherein each power converter is used to interface a generator to the supply network.

36. The plurality of power converters according to claim 19, wherein each power converter is used to interface a motor to the supply network (or busbar).

37. The plurality of power converters according to claim 19, wherein each power converter is operating as a static volt-ampere reactive (VAR) compensator.

38. The plurality of power converters according to claim 19, wherein the network bridge of each power converter is an active inverter.

39. The plurality of power converters according to claim 19, wherein the network bridge of each power converter is an active rectifier.

* * * * *